(12) United States Patent
Coleman

(10) Patent No.: US 9,522,747 B2
(45) Date of Patent: Dec. 20, 2016

(54) INFLATABLE DECELERATION APPARATUS

(71) Applicant: Analytical Mechanics Associates, Inc., Hampton, VA (US)

(72) Inventor: Michael Edward Coleman, Charlottesville, VA (US)

(73) Assignee: ANALYTICAL MECHANICS ASSOCIATES, INC., Hampton, VA (US)

(*) Notice: Subject to any disclaimer, the term of this patent is extended or adjusted under 35 U.S.C. 154(b) by 153 days.

(21) Appl. No.: 14/295,060

(22) Filed: Jun. 3, 2014

(65) Prior Publication Data
US 2015/0344139 A1 Dec. 3, 2015

(51) Int. Cl.
| B64D 17/80 | (2006.01) |
| B64G 1/62 | (2006.01) |
| B63B 21/48 | (2006.01) |
| B64D 19/00 | (2006.01) |

(52) U.S. Cl.
CPC ............... *B64G 1/62* (2013.01); *B63B 21/48* (2013.01); *B64D 17/80* (2013.01); *B64D 19/00* (2013.01)

(58) Field of Classification Search
CPC ......... B64D 17/80; B64D 19/00; B64D 17/00; B64D 17/02; B64G 2201/224; B64G 1/62; B63B 21/48; B63G 9/00; B63G 9/02; B63G 9/04; F41H 11/02; F41H 11/05; F42B 10/48; F42B 10/50; B60R 2021/0093; A62B 1/00; A62B 1/16; B60T 1/12; B60T 1/16; B64C 3/30
See application file for complete search history.

(56) References Cited

U.S. PATENT DOCUMENTS

| 2,698,020 A | 12/1954 | Phane |
| 2,761,636 A | 9/1956 | Finlay |
| 2,979,064 A | 4/1961 | Fischer |
| 2,979,287 A * | 4/1961 | Ross .................. B64C 3/30 244/123.11 |

(Continued)

FOREIGN PATENT DOCUMENTS

EP 0228479 B1 9/1991

OTHER PUBLICATIONS

Falls et al., "Bending Tests of Inflatable Dropstitch Panels," *11th International Conference on Fast Sea Transportation FAST* (Dept. of Naval Architecture and Ocean Engineering, United States Naval Academy, Annapolis, Maryland, USA). Honolulu, Hawaii: Sep. 2011. Proceedings paper published by the American Society of Naval Engineers; Copyright 2011: pp. 593-600.

(Continued)

*Primary Examiner* — Joseph W Sanderson
(74) *Attorney, Agent, or Firm* — Mueting, Raasch & Gebhardt, P.A.

(57) ABSTRACT

An apparatus for deceleration of a body may include a plurality of inflatable portions. The plurality of inflatable portions may be coupled together such that, when inflated, the plurality of inflatable portions defines a deceleration structure configured to decelerate the body. Each inflatable portion may include a first wall element, a second wall element opposite the first wall element, and a plurality of stitch members extending between and coupled to each of the first wall element and the second wall element.

18 Claims, 20 Drawing Sheets

(56) References Cited

U.S. PATENT DOCUMENTS

| | | | |
|---|---|---|---|
| 3,212,730 A * | 10/1965 | Tschudy | B64C 3/30 244/138 R |
| 3,228,634 A * | 1/1966 | Chakoian | F42B 10/50 102/388 |
| 3,286,951 A | 11/1966 | Kendall | |
| 3,327,738 A | 6/1967 | Sabbe | |
| 3,405,887 A * | 10/1968 | Mixson | B64C 39/06 244/113 |
| 3,481,569 A * | 12/1969 | Bell | B64C 3/30 244/123.11 |
| 3,519,032 A | 7/1970 | Sabbe | |
| 4,005,655 A * | 2/1977 | Kleinschmidt | F42B 10/50 102/386 |
| 4,166,597 A | 9/1979 | Seifert et al. | |
| 4,215,836 A | 8/1980 | Zacharin | |
| 4,504,031 A | 3/1985 | Andrews | |
| 4,637,330 A * | 1/1987 | Shewmon | B63B 21/48 112/417 |
| 4,756,340 A | 7/1988 | Janssen | |
| 4,832,288 A | 5/1989 | Kendall et al. | |
| 4,958,565 A * | 9/1990 | Koch | F42B 10/50 102/386 |
| 5,044,579 A | 9/1991 | Bernasconi et al. | |
| 5,080,306 A | 1/1992 | Porter et al. | |
| 5,108,046 A * | 4/1992 | Chaumette | B64G 1/62 244/110 D |
| 5,237,925 A * | 8/1993 | Vogt | F42B 10/50 102/386 |
| 5,400,831 A | 3/1995 | Gheysen | |
| 5,451,448 A | 9/1995 | Sawko et al. | |
| 5,853,151 A | 12/1998 | Cussac | |
| 6,264,144 B1 | 7/2001 | Thornton | |
| 6,607,166 B1 | 8/2003 | Pichkhadze et al. | |
| 6,997,218 B1 * | 2/2006 | Garcia | F41H 1/02 141/98 |
| 7,219,859 B2 * | 5/2007 | Johnson | B64G 1/24 244/158.9 |
| 7,837,154 B2 * | 11/2010 | Trabandt | B64G 1/62 244/159.1 |
| 7,892,630 B1 | 2/2011 | McKnight et al. | |
| 7,931,962 B1 * | 4/2011 | Willcockson | B64G 1/58 244/159.1 |
| 8,070,105 B2 | 12/2011 | Johnson et al. | |
| 8,186,625 B2 * | 5/2012 | De Jong | B64G 1/222 244/158.3 |
| 8,196,868 B2 * | 6/2012 | Kutter | B64G 1/1078 244/158.1 |
| 8,408,497 B2 * | 4/2013 | Boelitz | B64G 1/002 244/158.9 |
| 8,733,706 B1 * | 5/2014 | Fernandez | B64G 1/222 244/139 |
| 8,833,517 B2 * | 9/2014 | Filatov | A62B 1/22 182/3 |
| 2002/0053311 A1 * | 5/2002 | Yaffe | B63B 27/24 114/73 |
| 2005/0211828 A1 | 9/2005 | Gloyer et al. | |
| 2006/0060706 A1 * | 3/2006 | Elam | B64C 3/30 244/128 |
| 2008/0078883 A1 * | 4/2008 | de Jong | B64G 1/222 244/158.3 |
| 2008/0078884 A1 * | 4/2008 | Trabandt | B64G 1/62 244/171.7 |
| 2009/0049757 A1 * | 2/2009 | Potter | B64C 3/30 52/2.23 |
| 2009/0211188 A1 | 8/2009 | Defoort et al. | |
| 2009/0294595 A1 * | 12/2009 | Pellegrino | B64G 1/1078 244/172.4 |
| 2010/0187364 A1 * | 7/2010 | Kutter | B64G 1/222 244/171.7 |
| 2010/0187365 A1 * | 7/2010 | Kutter | B64G 1/1078 244/171.7 |
| 2010/0320329 A1 * | 12/2010 | Boelitz | B64G 1/002 244/158.9 |
| 2010/0327107 A1 * | 12/2010 | Featherstone | B64G 1/002 244/3.24 |
| 2011/0005632 A1 | 1/2011 | Bertolani | |
| 2011/0315475 A1 * | 12/2011 | Filatov | A62B 1/22 182/3 |
| 2012/0091280 A1 * | 4/2012 | Kutter | B64G 1/222 244/171.7 |
| 2014/0166815 A1 * | 6/2014 | Dula | B64G 1/14 244/164 |
| 2014/0263841 A1 * | 9/2014 | Featherstone | B64G 1/002 244/158.9 |

OTHER PUBLICATIONS

Goodyear Inflatoplane. From Wikipedia, the free encyclopedia. [retrieved on Jan. 9, 2016]. Retrieved from the Internet<URL:http://en.wikipedia.org/wiki/Goodyear_Inflatoplane> 4 pages.

Wielgosz et al., "Deflections of inflatable fabric panels at high pressure" *2002 Thin-Walled Structures*, 40:523-536.

* cited by examiner

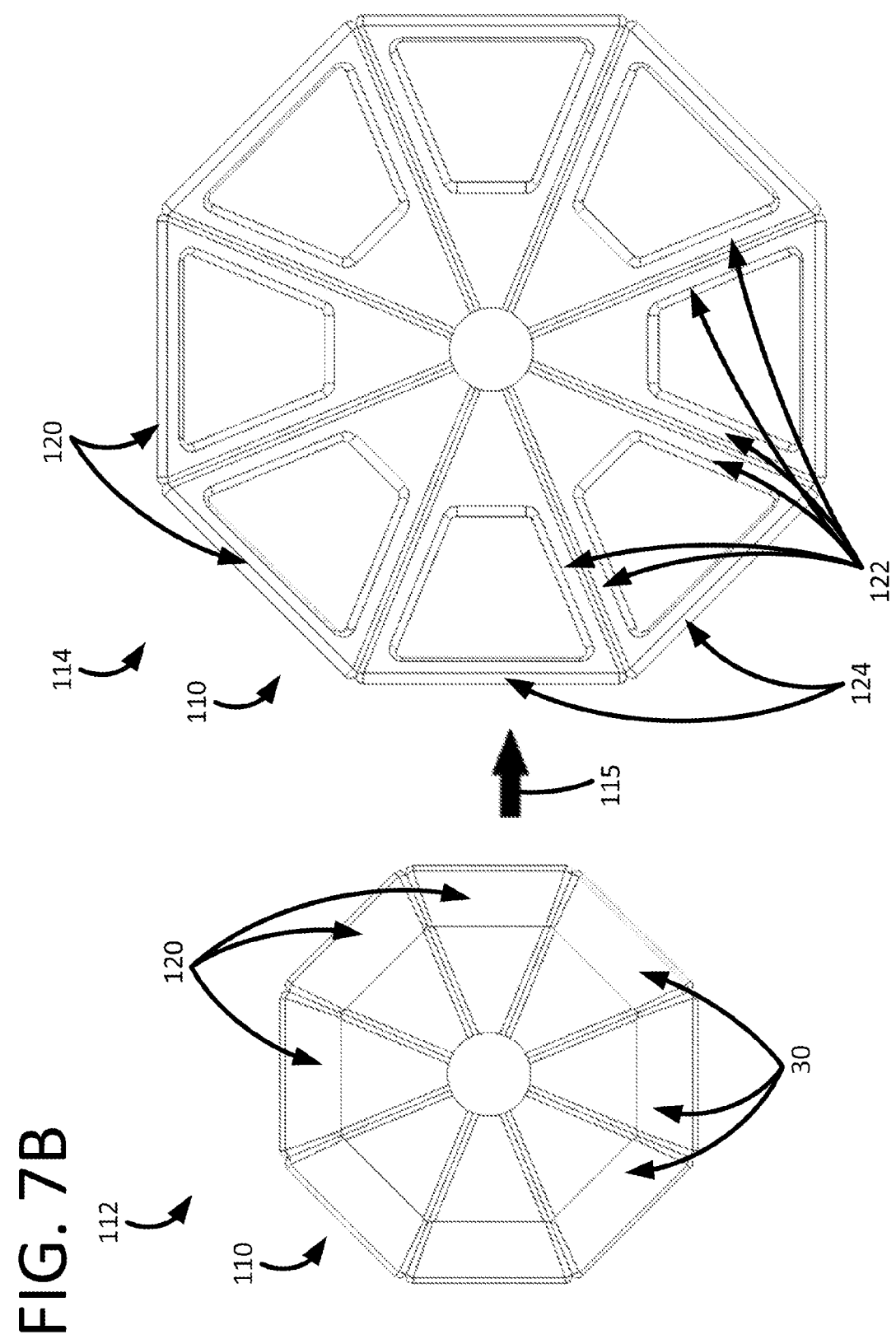

INFLATABLE DECELERATION APPARATUS

The present disclosure relates generally to aerodynamic decelerators (e.g., retarding mechanisms, drag inducing devices, etc.) configured to retard, or slow, the motion, or velocity, of a body (e.g., a spacecraft, water craft, a rocket, a missile, aircraft, projectile, etc.) relative to a fluid reservoir such as, e.g., an atmosphere, a body of water, etc. that the body is moving through and/or to retard, or slow, the motion, or velocity, of a fluid stream relative to a fixed body (e.g., a body fixed within the fluid stream such that the fluid stream moves by, or past, the body without the body moving).

Decelerators may include one or more provisions, or structures, that may be towed, or located, behind a body (e.g., parachutes, detached ballutes, etc.) to create drag downstream of the body or may include one or more provisions, or structures, that may be attached adjacent to one or more parts, or regions, of the body, or other attached structure of the payload, (e.g., wings, isotensoid, hypercone, slats, flaps, spoilers, any aerodynamic control surface, etc.) to create drag about the body and one or more provisions.

Inflatable structures may be used as decelerators. Such inflatable structures, however, may have relatively few geometric variations to define the shape and mechanical properties of the inflated, or completed, structure. Typically, if these inflatable structures are made of fabric, the elemental forms are revolved sections defining spherical or cylindrical profiles. Further, the inflatable structures may have little, or no, internal structure. For example, an inflatable structure used as a decelerator may define a form similar to a "pillow." For example, a "pillow" form may be formed, or created, by two flat sheets of fabric adjoined along the entire perimeter and having no internal structure. The "pillow" decelerator may wrap, or form, itself around the body that it is intended to decelerate from the drag forces acting thereon. A "pillow" decelerator may not provide any control of the deceleration of the body. In other words, the "pillow" decelerator may be described as a passive deceleration apparatus.

A stack of inflatable toroidal rings has been used as an aerodynamic decelerator construction for high load applications (such as the atmospheric reentry of a spacecraft). The stack of inflatable toroidal rings, when inflated, assembled, and deployed, may be configured in a cone shape.

Drop stitch inflatable structures have been used as wings and stabilizers for an experimental aircraft (e.g., the GOODYEAR AEROSPACE INFLATOPLANE). Further drop stitch inflatable structures have been used, for recreational applications, such as small boat decks or floors and gymnastics equipment.

SUMMARY

The problems with decelerating bodies such as, e.g., spacecraft, with other approaches may be addressed by the exemplary inflatable deceleration apparatus described herein. For example, the exemplary deceleration apparatus may be described as being densely packed/stowed for transportation or when in the pre-deployment state, reconfigurable to adapt to multiple vehicle/body/projectile installations (e.g., multiple configurations may be used for various different practical deployment applications), easily filled with inflation media (e.g., no part of the system may be burdened by the inflation apparatus), adaptive to multiple fluid reservoir environments (such as, e.g., Venus, which has comparatively thick planetary atmosphere, or Mars, which has a comparatively thin planetary atmosphere), tailorable to suit individual case, low mass, reliable, scalable, modular, etc. and/or may have few integration requirements.

One exemplary apparatus for decelerating a body may include a plurality of inflatable portions coupled to the body. Each inflatable portion of the plurality of inflatable portions may include a first wall element, a second wall element coupled to the first wall element to define a cavity, and a plurality of stich members (e.g., defining a double-walled, drop-stitch structure). Each stitch member of the plurality of stitch members may extend between and be coupled to each of the first wall element and the second wall element to restrict movement between the first wall element and the second wall element when the cavity is filled with a fluid. Each inflatable portion of the plurality of inflatable portions may be configurable in at least a stowed configuration and a deployed configuration. An inflatable portion of the plurality of inflatable portions may be deflated when configured in the stowed configuration, and an inflatable portion of the plurality of inflatable portions may be inflated with fluid so as to be expanded and resilient when configured in the deployed configuration. When at least one inflatable portion of the plurality inflatable portions is configured in the deployed configuration (e.g., defining a blunted-cone shape when in the deployed configuration), the plurality of inflatable portions may be configured to provide a deceleration surface area greater than a pre-deployment surface area defined by the body when each of the plurality of inflatable portions are configured in the stowed configuration. The exemplary apparatus may further include inflation apparatus coupled to the plurality of inflation portions and configured to provide fluid to the plurality of inflation portions to configure each inflation portion of the plurality of inflation portions in at least the deployed configuration.

In one or more embodiments, at least one inflatable portion of the plurality of inflatable portions may include a one-way valve for providing fluid into the cavity and to restrict fluid from leaving the cavity. In one or more embodiments, the plurality of inflatable portions may include a support inflatable portion coupled to and extending between at least another inflatable portion of the plurality of inflatable portions and one or more of the body and at least another inflatable portion of the plurality of inflatable portions to provide support therebetween when one of more inflatable portions of the plurality of inflatable portions are configured in the deployed configuration.

In one or more embodiments, the plurality of stitch members of each inflatable portion of the plurality of inflatable portions may define a stitch density about each inflatable portion. The stitch density may be uniform or non-uniform/irregular across at least one inflatable portion of the plurality of inflatable portions to form a selected shape when the at least one inflatable portion is configured in the deployed configuration.

In one or more embodiments, each of the plurality of stitch members of inflatable portion of the plurality of inflatable portions may define a stitch length and the stich lengths may be irregular across at least one inflatable portion of the plurality of inflatable portions to form a selected shape when the at least one inflatable portion is configured in the deployed configuration In one or more embodiments, each inflatable portion of the plurality of inflatable portions may include at least one side wall element coupled to and extending between the first wall element and the second wall element, and the at least one side wall element may further define the cavity. In one or more embodiments, a seam may be defined between at least two inflatable portions of the plurality of inflatable portions positioned adjacent each other, and at least one inflatable portion of the plurality of inflatable portions may be positioned to extend across and overlap the seam to provide support to the seam.

In one or more embodiments, the inflation apparatus may include a vessel for holding a material for use in filling the plurality of inflatable portions with fluid to configure the plurality of inflatable portions into the deployed configuration. In one or more embodiments, the inflation apparatus may be configured to inflate each inflation portion of the plurality of inflation portions individually. In one or more embodiments, the inflation apparatus may include a scoop aperture configured to capture fluid during deceleration for use in filling the plurality of inflatable portions with fluid to configure the plurality of inflatable portions into the deployed configuration.

In one or more embodiments, the plurality of inflatable portions may define a deceleration structure when each inflatable portion of the plurality of inflatable portions is configured in the deployed configuration, and the deceleration structure may be asymmetric about an axis along the trajectory of the body such that at least one region of the deceleration structure provides more lift than at least another region of the deceleration structure.

In one or more embodiments, at least one inflatable portion of the plurality of inflatable portions may be configurable in the stowed configuration while at least one inflatable portion of the plurality of inflatable portions is configured in the deployed configuration.

In one or more embodiments, the plurality of inflatable portions may be further configurable in at least a first deployed configuration and a second deployed configuration. When in the second deployed configuration, the plurality of inflatable portions may provide a deceleration surface area greater than a deceleration surface area of the plurality of inflatable portions when in the first deployed configuration.

In one or more embodiments, the exemplary apparatus may further include restraint apparatus configurable in at least a storage configuration and a released configuration. The restraint apparatus, when in the storage configuration, may restrict at least one region of at least one inflatable portion of the plurality of inflatable portions from filling with the fluid when the at least one inflatable portion is configured in the deployed configuration, and the restraint apparatus, when in the released configuration, may release the at least one region of the at least one inflatable portion of the plurality of inflatable portions for filling with the fluid.

One exemplary apparatus for decelerating a body may include a plurality of inflatable portions coupled to the body. Each inflatable portion of the plurality of inflatable portions may include a first wall element, a second wall element coupled to the first wall element to define a cavity, and a plurality of stich members. Each stitch member of the plurality of stitch members may extend between and may be coupled to each of the first wall element and the second wall element to restrict movement between the first wall element and the second wall element when the cavity is filled with a fluid. Each of the inflatable portion of the plurality of inflatable portions may be coupled together to form a deceleration when the plurality of inflatable portions are inflated with fluid so as to be expanded and resilient. The deceleration may provide a deceleration surface area greater than a pre-deployment surface area defined by the body with prior to inflation of the plurality of inflatable portions. The exemplary apparatus may further include inflation apparatus coupled to the plurality of inflation portions and configured to provide fluid to the plurality of inflation portions to inflate each of the plurality of inflation portions to form the deceleration structure.

In one or more embodiments, the inflation apparatus may be configured to provide fluid to each inflation portion of the plurality of inflation portions individually to control how much fluid is provided to each of the inflation portions. At least one inflation portion of the plurality of inflation portions may be configured to have less fluid than at least another inflation portion of the plurality of inflation portions such that at least one region of the deceleration structure provides more lift than at least another region of the deceleration structure.

The present disclosure relates to a retarding apparatus, or mechanisms, having a structure which may permit many variations of inflatable structural members such as, e.g., spheres, cylinders, pillows, panels, wing-shaped members, flat-panel elemental forms, etc. by using drop stitch technical textiles.

In at least one embodiment, the deceleration apparatus may not be symmetrical or may have only one set of load bearing structures (e.g., in this embodiment, there may be no load sharing or other secondary structures). Additional structures may be intended to provide secondary load bearing capacity during deflection or unpredicted loads and can be readily applied to the one or more embodiments described herein. Such structures may include buttresses, shear webs, flexible stays, air beams, air bags (e.g., pillows primarily used to fill voids where the surrounding structure will bear and provide support), etc.

An exemplary deployable deceleration apparatus may be attached or towed behind a body so that a greater control of the final form, as well as increased structural efficiency, is possible by utilization of drop stitch technical textiles. Further, the exemplary deployable deceleration apparatus may be economically constructed by replacing a number of manual operations with automated fabrication methods. Additionally, the embodiments described herein may provide a new range of aerospace-ready technical textiles that may survive a broad range of environments and applications to ensure the broadest set of applications.

The exemplary inflatable, deployable deceleration apparatus described herein may be configured to provide for static, or stationary, installations of the same embodiment to allow for the creation of drag within a free field flow such as wind resistance or tidal resistance. In other words, the decelerator apparatus can be installed in a flow as a fixed structure (e.g., like to a river floor or wall of a tunnel, etc.) such that deceleration apparatus may be used as dampers for the fluid flow to change momentum of the working media. The deceleration apparatus may have broad application by compatibility with a broad range of working media and having numerous types of compatible pressurization media.

The exemplary inflatable, deployable deceleration apparatus described herein may be configured to provide, or allow, multiple stage deployment in a manner consistent with trajectory analysis and design efforts undertaken by aerodynamics engineers.

The exemplary inflatable, deployable deceleration apparatus described herein may be configured to allow asymmetric profiles for the deceleration structure to allow for tailored lift-to-drag ratios, which may change flight dynamics and increase timeline for action of an attached body falling from some altitude. The exemplary deceleration apparatus may use, or utilize, laminated construction to allow for smooth transitional surfaces and superior rigidity across inflatable segment joints and seams. Further, the deceleration apparatus may be configured to allow for rapid fill by centralizing the fittings and fluidic interfaces to the inflatable volumes.

The exemplary inflatable, deployable deceleration apparatus described herein may be configured to provide, or allow for, curved or non-planar inflatable portions, such as a tapered panel, for the purpose of optimizing mass and performance of onboard inflation apparatus.

The exemplary deceleration apparatus may feature an attachment scheme where the apparatus may be dismantled into its discrete inflatable portions, segments, or gores, by way of "bolt rope," "bolt rope" in conjunction with a track, grommets, grommets in conjunction with lacing and/or clips, zipper, tie bar, tension bar, clamping, or other fastening device or apparatus. In at least another embodiment, the fastening apparatus may include "lugs" or "slugs," where a track may be used on the rigid body and smaller segments may engage the track thereby allowing for folding/flaking without binding the fabric in the track.

In another embodiment, more permanent apparatus may include elastomeric or metallic attachment features may be used if deemed mandatory to the integrity of the apparatus. This may include tape of a material compatible for adhesion to adjoin the gore panels, permanent clips such as staples or rivets, etc.

One exemplary deceleration apparatus to be deployed into or against a fluid stream moving relative to the apparatus (e.g., to retard motion during free flight in the fluid stream or fluid medium) may include one or more inflatable segments or portions. Each inflatable segment may include a top panel and bottom panel defining a cavity and may include a plurality of tie threads employed to maintain a predefined distance and shape between the top and bottom panel of each segment. In at least one embodiment, the top panel may be edge sealed to the bottom panel to provide for nonporous volumes, which may require reduced mass flow/maintenance of pressure (e.g., intended for containing pressurized inflation media). In at least one embodiment, one or more inflatable segments may be attached, or coupled, to at least another body, such as another segment or the body. In at least one embodiment, valve apparatus may be configured to monitor and check the inflow of air into the inflatable segments. In at least one embodiment, the deceleration apparatus may include self-contained inflation apparatus central to the body or air scoop apparatus attached to the underside of a bottom panel containing at least one passage for admitting the free stream media at a positive pressure into the structure. In at least one embodiment, the secondary structures (e.g., cylindrical structures also known as "air beams," pillow structures that do not have internal structure and are not being spherical or cylindrical, etc.) may be used by the exemplary deceleration apparatus described herein.

In one or more embodiments, the inflatable portions may be formed by a double wall drop-stitch technical textile. In at least one embodiment, the drop-stitch structure may employ a tie-thread geometry consistent with an isometric grid. In at least one embodiment, the drop-stitch structure may employ tie thread geometry consistent with an engineered pattern for biased load path adjustment (e.g., for adjustment of the structural performance and final shape/form of the panel and walls). In at least one embodiment, the drop-stitch structure may employ tie thread geometry having non-uniform lengths consistent with an engineered pattern for biased load path adjustment. In at least one embodiment, the drop-stitch structure may employ edge sealing and a fluid-tight configuration having flat seam construction with no filler material inserted between the textile faces of the drop stitch parent material. In at least one embodiment, the drop-stitch structure may employ edge sealing and a fluid-tight configuration having flat seam construction with no filler material inserted between the textile faces of the drop stitch parent material. In at least one embodiment, the drop-stitch structure may employ edge sealing and a fluid-tight construction having mechanically secured (such as crimped or riveted) structure with or without filler material inserted between the textile faces of the drop stitch parent material. In at least one embodiment, the drop-stitch structure may employ edge sealing and a fluid-tight configuration having rolled or folded construction without filler material inserted between the textile faces of the drop stitch parent material (e.g., the drop stitch structure may be clamped, which may utilize a removable assembly to retain the folded/rolled interface).

In at least one embodiment, attachment of discrete pressure segments/envelopes/portions into a formation of complex decelerator geometries may be accomplished by stitching segments/envelopes/portions to one another. In at least one embodiment, attachment of discrete pressure segments/envelopes/portions into a formation of complex decelerator geometries may be accomplished by bonding segments/envelopes/portions to one another with an adhesive or an adhesive sealant. In at least one embodiment, attachment of discrete pressure segments/envelopes/portions into a formation of complex decelerator geometries may be accomplished by mechanically affixing segments/envelopes/portions to one another (e.g., staples, bolts, clips, other rigid fasteners). In at least one embodiment, attachment of discrete pressure segments/envelopes/portions into a formation of complex decelerator geometries may be accomplished by application of cordage to tie segments/envelopes/portions to one another (e.g., ropes, knots, cordage handling fixtures such as cleat and winches). In at least one embodiment, the attachment of discrete pressure segments/envelopes/portions into a formation of complex decelerator geometries may be accomplished by use, or application, of a "zipper" interlocking tooth attachment mechanism. In at least one embodiment, attachment of discrete pressure segments/envelopes/portions into a formation of complex decelerator geometries may be accomplished by use, or application, of "hook and loop" attachment mechanisms. In at least one embodiment, attachment of discrete pressure segments/envelopes/portions into a formation of complex decelerator geometries may be accomplished by application of a "boltrope and track" mechanism. In at least one embodiment, the attachment of discrete pressure segments/envelopes/portions into a formation of complex decelerator geometries may be accomplished by application of a "draw bar and tensioner" mechanism. In at least one embodiment, attachment of discrete pressure segments/envelopes/portions into a formation of complex decelerator geometries may be accomplished by application of multiple-layer fabrication of panels.

In one or more embodiments, the exemplary deceleration apparatus may employ, or use, a direct inflation process of each pressure segment/envelope/portion by a common manifold located central to the attached body and coupled to one or more of a gas generator or pressurized tank. In at least another embodiment, direct inflation of each pressure segment/envelope/portion by individual inflation system such as a gas generator or a pressurized tank system may be employed or used. In at least another embodiment, remote inflation of each pressure segment/envelope/portion by individual feed hose or tubing may provide a balanced flow of inflation media at engineered rates. In at least another embodiment, an air scoop, located on a bottom panel and a stiffener may each contain a plurality of openings aligned to permit passage of air into the pressurized segment/envelope/portion and may be used to inflate the inflatable segment/envelope/portion.

The exemplary deceleration apparatus may be configured in a plurality of different stowed and deployed configurations. For example, the deceleration apparatus may operate by deploying from an initial dense packed configuration to a final geometry defining a deceleration structure by use of an inflation and mechanical retainer. Further, the deceleration apparatus may operate by imparting a predesigned stability (e.g., inherently stable, inherently unstable, spin stabilized, etc.) on the deceleration structure.

In at least one embodiment, the deceleration apparatus may be configured for impact protection if a surface interface is encountered (e.g., Earth, ocean, other broad target). In at least one embodiment, the deceleration apparatus may be configured to stabilize a vehicle upon landing if pressurization upon inflation is designed to remain in action in an engineered number of configurations dependent on application. In at least one embodiment, the deceleration apparatus can be inflated prior to operation to act as a debris shield such as a fragmentation shield or a micrometeoroid and orbital debris (MMOD) in exoatmospheric application. In at least one embodiment, the deceleration apparatus may provide pre-deployment thermal insulation protection by an engineered design of the packing configuration. In at least one embodiment, the deceleration apparatus may be configured to operate in incompressible flow fields such as subsonic deployment. In at least one embodiment, the deceleration apparatus may be configured to operate in compressible flow fields such as transonic flight and in a higher speed domain (e.g., up to and including hypersonic domains). In at least one embodiment, the deceleration apparatus may include secondary and tertiary stages of operation by use of expansion or retraction of a deceleration, or drag, surface area. In at least one embodiment, the deceleration apparatus may be include secondary and tertiary control surfaces such as flaps or ailerons being either of similar material to the inflatable portion or of a rigid component. In at least one embodiment, the deceleration apparatus may be configured for active control of the shape of the completed deceleration, or drag, structure by use of local pressure control for each inflatable pressure envelope. In at least one embodiment, the deceleration apparatus may be configured for active control of the shape of the completed deceleration structure by use of local deformation by load-reaction devices such as air beams, drop-stitch secondary panels, cable/rope, and winches.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 7B is a top plan view of the deceleration apparatus of FIG. 7A.

DETAILED DESCRIPTION OF EXEMPLARY EMBODIMENTS

Figure 1A:
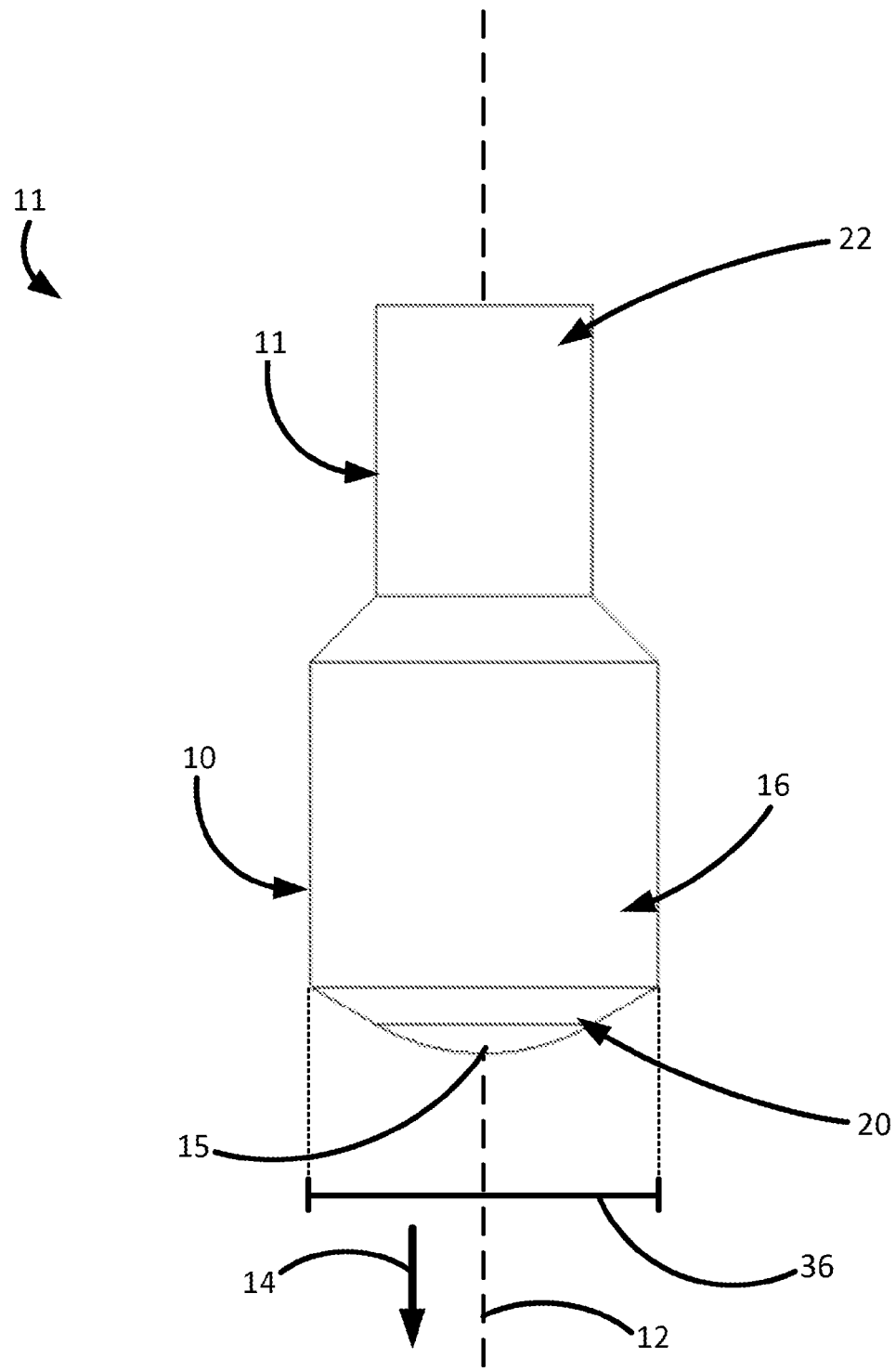
FIG. 1A is a side view of an exemplary deceleration apparatus coupled to a body and configured in a stowed, or pre-deployment, configuration.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary embodiments shall be described with reference to FIGS. 1-9. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Exemplary apparatus for decelerating a body are described herein. Generally, the exemplary deceleration apparatus may include one or more inflatable portions that may be used to provide a deceleration structure for, e.g., atmospheric entry systems. The inflatable portions may be configured in a stowed configuration, e.g., during transit, and a deployed configuration, e.g., during deceleration when entering an atmosphere of a planet. When in the deployed configuration, the one or more inflatable portions may define, or form, a deceleration structure about, or proximate, the body to decelerate the body within a fluid environment. Although the exemplary deceleration apparatus described herein may be primarily described within respect to spacecraft, and more specifically, spacecraft being decelerated from high speeds whilst entering an atmosphere of a planetary body, the exemplary deceleration apparatus may be used with respect to any problem or endeavor in conjunction with decelerating any body or object.

Generally, the exemplary deceleration apparatus, or apparatus for decelerating an object, may be stowed, or in a stowed configuration, until the object, or body, that the apparatus is attached, or coupled, thereof is ready to be decelerated and then the exemplary deceleration apparatus may be released and deployed to provide deceleration of the body, or object, by, e.g., increasing the surface area of the object or body.

The exemplary apparatus may be described in terms of various configurations or states. For example, when the deceleration apparatus, or one or more portions thereof, are stowed, and thus, may not be configured to decelerate the body, it may be described herein the deceleration apparatus, or one or more portions thereof, is in, or configured in, a stowed configuration. Further, when the deceleration apparatus, or one or more portions thereof, are deployed and thus configured to decelerate the body, it may be described herein that the deceleration apparatus, or one or more portions thereof, are in, or configured in, a deployed configuration. The exemplary deceleration apparatus may decelerate a body by increasing the surface area of a body, and to do so, the deceleration apparatus may change shape and size when transitioning from the stowed configuration to the deployed configuration.

Multiple views of exemplary deceleration apparatus 10 are depicted in FIGS. 1A-1D. As shown in FIG. 1A, the exemplary apparatus 10 is configured in a stowed configuration and is coupled to, or attached to, a body 11. As shown, the body 11 may be a spacecraft such as, e.g., capsule, satellite, sample return vehicle (e.g., vehicle for returning soil samples from Mars, an asteroid, etc.), an extravehicular emergency astronaut deorbit vehicle, etc. In other embodiments, the body may not be spacecraft, and may instead be a watercraft, torpedo, aircraft, missile, rocket, rocket launch vehicle segment, free-fall ordinance (e.g., bomb), etc. Although the deceleration apparatus 10 is described as being coupled, or attached to, the body 11, the deceleration apparatus 10 may also be described as being integral, or part of the body 11. As shown, the deceleration apparatus 10 is located proximate, or near, a front end portion 20 of the body 11. In other embodiments, the deceleration apparatus 10 may be located proximate, or near, a rear end portion 22 of the body 11 or somewhere between the rear end portion 22 and the front end portion 20, depending on the desired purpose. In the example depicted, the deceleration apparatus 10 may be located proximate the front end portion 20 of the body 11 to, e.g., provide a heat shield for the body 11 when decelerating through an atmosphere, provide aerodynamic stability when decelerating through an atmosphere, and/or provide locations and operation of control surfaces such as trim tabs, flaps, spoilers, etc.

The body 11 may be described as lying along a central axis 12, which may also be the direction of travel, or trajectory, 14 of the body 11. For example, the body 11 may be described as moving along central axis 12 in direction 14. It is to be understood, however, that when the body 11 is decelerating, e.g., within an atmosphere of a planet, the direction of travel, or trajectory, 14 may not lie along the central axis 12 due to, e.g., aerodynamic forces such as lift, drag, etc. In other words, an induced angle of attack may provide roll or pitch that the trajectory path and the axis of the body's coordinate system are not coaxial. Nonetheless, many of the features and elements of the exemplary apparatus described herein may be described with respect to the central axis 12 of the body 11 and the direction 14 of travel as shown in the Figures.

Further, as shown, the deceleration apparatus 10 may be covered, or located within, one or more protection elements 16, such as, e.g., a heat shield, a nose cone, etc. In at least one embodiment, it may be described that the deceleration apparatus 10 may be protected in thermally severe environments (e.g., atmospheric entry) by a thermal protection system (e.g., which may be pleated or folded).

The protection elements 16 may assist in maintaining the deceleration apparatus 10 in the stowed configuration. The stowed configuration may be generally defined as a configuration in which the deceleration apparatus 10 is not being actively used to decelerate the body 11. For example, the deceleration apparatus 10 may be in a stowed configuration when the body is traveling between planets (e.g., when deceleration of the body is not desired). Further, the deceleration apparatus 10 may be described as defining less volume, or taking up less space, when configured in the stowed configuration.

Figure 1B:
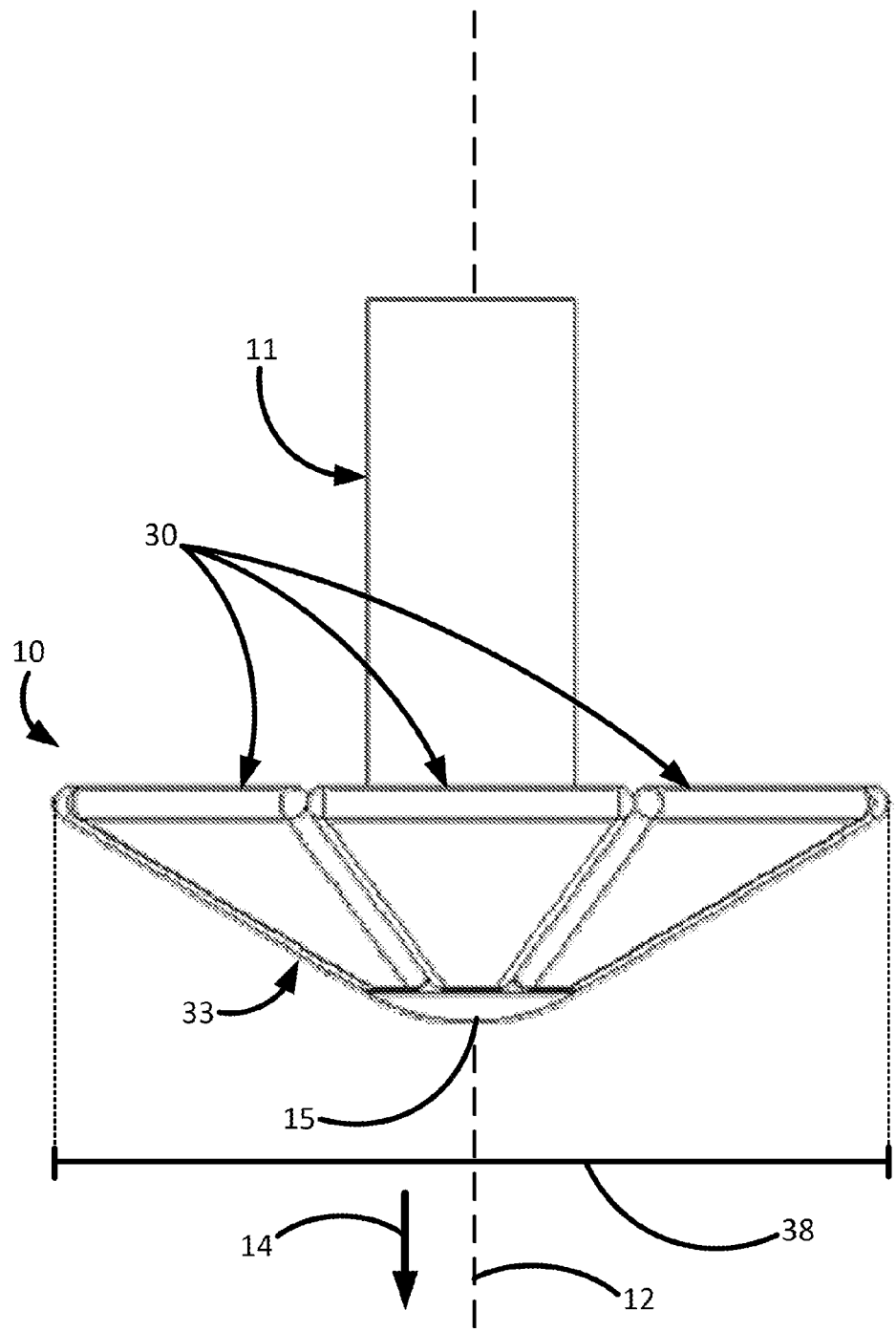
FIGS. 1B-1D are a side view, a perspective view, and a top plan view of the deceleration apparatus of FIG. 1A with the deceleration apparatus configured in a deployed configuration.
Figure 1C:
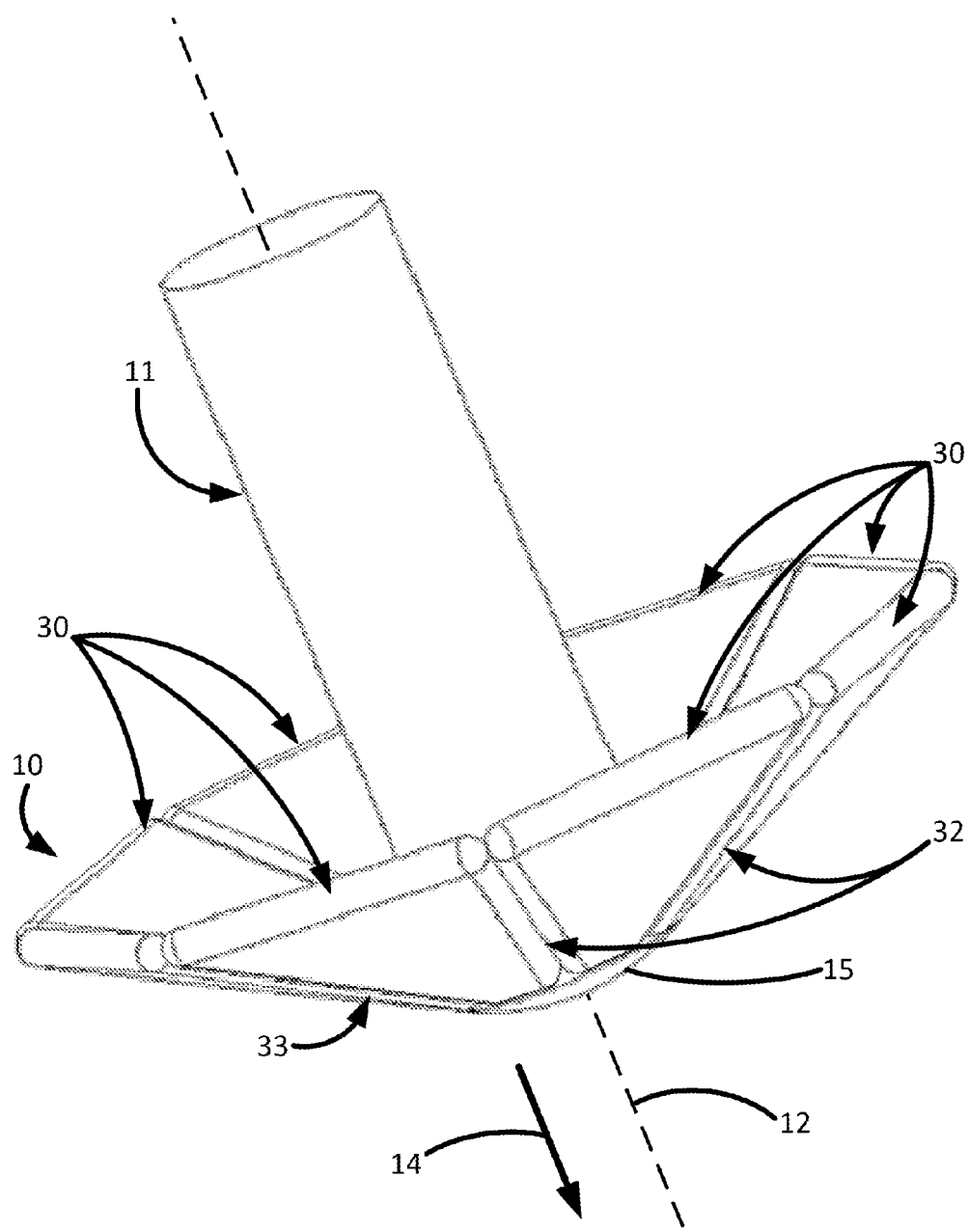
Figure 1D:
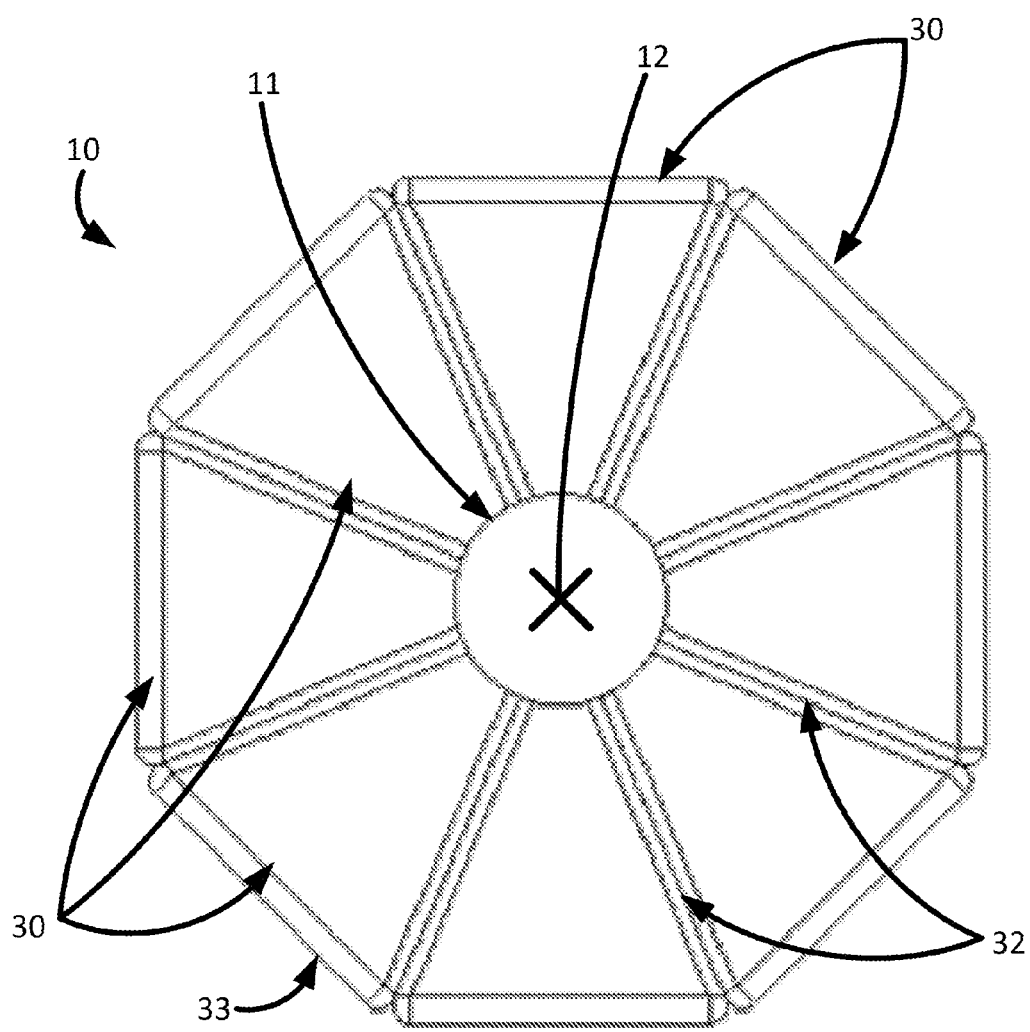

The deceleration apparatus 10 is configured in the deployed configuration in FIGS. 1B-1D. The deceleration apparatus 10 may include a plurality of inflatable portions 30, and as shown in FIGS. 1B-1D, the plurality of inflatable portions 30 are configured in the deployed configured to, e.g., form, or provide, a deceleration, or drag, surface area greater than a surface area defined by the body with each of the plurality of inflatable portions 30 configured in the stowed configuration. In other words, the plurality of inflatable portions 30 may define, or form, a deceleration, or drag, structure 33 configured to decelerate the body 11. As shown, the deceleration structure 33 resembles a blunted cone-type shape. In other embodiments, the deceleration structure 33 may be formed, or defined, by a plurality of inflatable portions 30 configured in the deployed configuration may resemble a wedge-type shape, wing/airfoil-type shape, capsule-type shape, etc.

The deceleration structure 33 may be covered, or coated, by one or more portions, materials, or coatings to provide a forward surface of the deceleration structure 33. The forward surface of the deceleration structure 33 may face the direction of travel 14. The forward surface may include one or more heat resistant or insulative materials to, e.g., shield or insulate the body 11 from heat that may be created due to the deceleration.

As described herein, that plurality of inflatable portions 30 may form, or provide, a deceleration, or drag, surface area when in the deployed configuration greater than a surface area defined by the body 11 with each of the plurality of inflatable portions 30 configured in the stowed configuration. For example, as shown in the side views of FIGS. 1A-1B, one dimension of the surface area defined by the body 11 with each of the plurality of inflatable portions 30 configured in the stowed configuration may be represented by line 36, and one dimension of the deceleration, or drag, surface area defined by each of the plurality of inflatable portions 30 configured in the deployed configuration may be represented by line 38. Line 38 is longer than line 36, which indicates that the deceleration, or drag, surface area is greater than the pre-deployment surface area. Additionally, although one of ordinary skill in the art will recognize that lines 36, 38 only represent one dimension of at least a two-dimensional surface area comparison, it would be understood by one having ordinary skill in the art that the deceleration surface area defined by the plurality of inflatable portions 30 as shown in FIGS. 1B-1D is greater than the pre-deployment surface area defined by the body 11 with each of the plurality of inflatable portions 30 configured in the stowed configuration.

The diameter of the deceleration surface area (e.g., the diameter taken perpendicular to the axis 12 such as in the FIG. 1D) defined by exemplary deceleration apparatus 10 when deployed may be about 1 meter to about 30 meters. For example, the diameter of the deceleration surface area defined by exemplary deceleration apparatus 10 when deployed may be greater than or equal to about 1 meter, greater than or equal to about 2 meters, greater than or equal to about 3 meters, greater than or equal to about 5 meters, greater than or equal to about 10 meters, greater than or equal to about 15 meters, greater than or equal to about 20 meters, etc. and/or less than or equal to about 50 meters, less than or equal to about 40 meters, less than or equal to about 35 meters, less than or equal to about 30 meters, less than or equal to about 25 meters, less than or equal to about 20 meters, less than or equal to about 15 meters, less than or equal to about 10 meters, etc.

In at least one embodiment, it may be described that prior to performing the primary function of inducing drag forces between a body and a relatively moving fluid, the initial physical state of the deceleration apparatus 10 is a folded or otherwise reduced-volume configuration where the inflatable portions can be enclosed within a geometric constraint volume. Further, one exemplary deceleration apparatus 10 may be configured in a packed form for use in rocket launched vehicles. Further, the deceleration apparatus 10 may be deployed using a fluid media being of either incompressible type (such as, e.g., water or similar), or compressible (such as, e.g., gaseous nitrogen or carbon dioxide).

The body 11 or deceleration apparatus 10 may further include a tip portion 15. If the tip portion 15 is part of the deceleration apparatus 10, the tip portion 15 may also be an inflatable portion similar to the inflatable portions 30 described herein. If the tip portion 15 is part of the body 11, the tip portion 15 may be a protective shield portion configured to protect the front end portion 20 of the body 11.

The plurality of inflatable portions 30 may be attached, or coupled, to each other at one or more seam regions 32 as shown in FIGS. 1C-1D. The inflatable portions 30 may be coupled to each other about the seam regions 32 by using stitching, adhesive, adhesive sealant, staples, bolts, clips, rivets, permanent clips, zippers, bolt ropes, grommets, clamps, etc. The coupling between the plurality inflatable portions 30 may define, or assist in the definition of, the shape of the deceleration structure 33. For example, when each of the inflatable portions 30 are being inflated and begin to take shape, the coupling between the inflatable portions 30 may restrict the movement of other inflatable portions such that the deceleration, or drag, structure 33 is formed or shaped.

Additionally, it may be described that the elements and/or structure of each of the inflatable portions 30 may provide the structural stability and shape of the deceleration structure 33 when the inflatable portions 30 are configured in the deployed configuration. As described herein the plurality of inflatable portions 30 may be deflated, or void of a fluid, when in the stowed configuration, and may be inflated, or full of a fluid, when in the deployed configuration.

Figure 2:
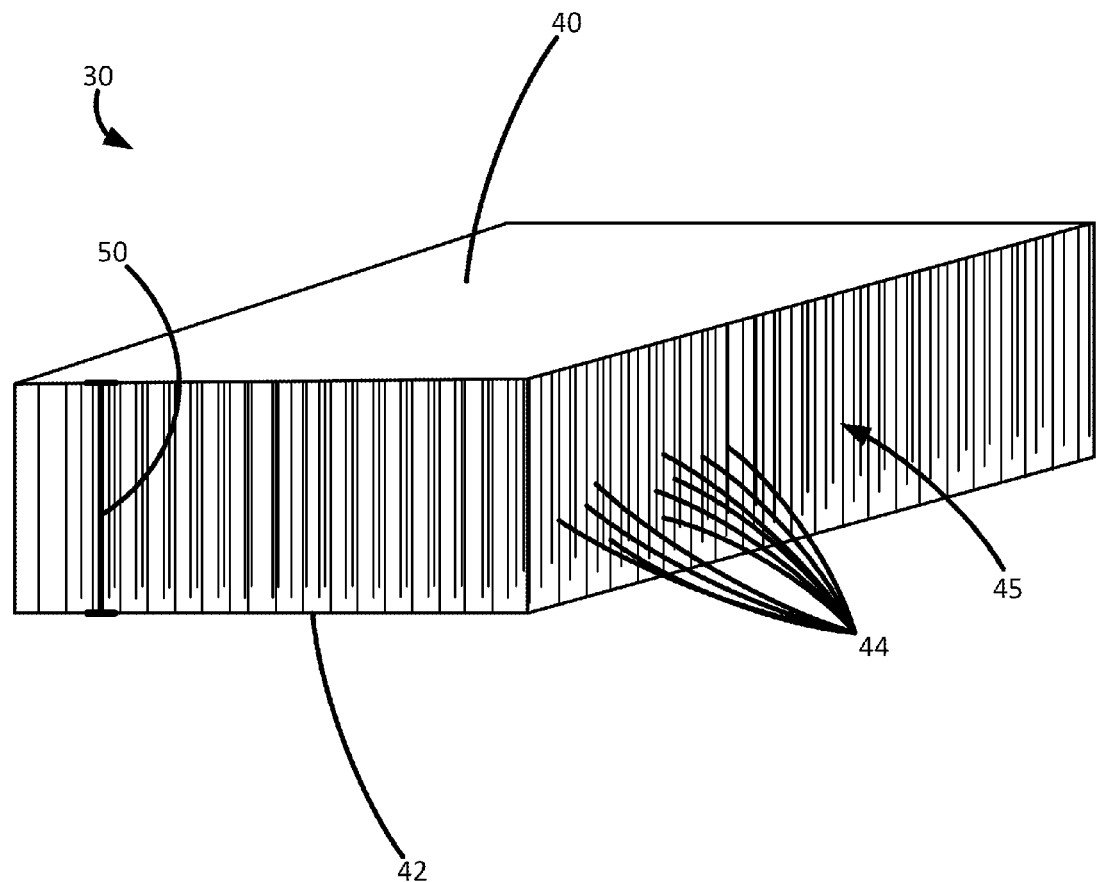
FIG. 2 is a perspective view of an exemplary inflatable portion of the deceleration apparatus of FIG. 1.

An exemplary inflatable portion 30 is depicted in FIG. 2. As shown, the inflatable portion includes a first wall element 40 and a second wall element 42 located opposite the first wall element 40. The first wall element 40 and the second wall element 42 define a cavity 45 therebetween or therein. Generally, the cavity of the inflatable portion 30 is sealed such that air or another fluid may be sealed within the cavity so as to provide inflation and/or deflation of the cavity 45 of the inflatable portion. As shown, side wall elements are not shown coupling between the first and second wall elements 40, 42 as to show the internal structure of the exemplary inflatable portion 30.

The wall elements 40, 42 may include one or more materials such as, e.g., carbon fiber, aromatic polyamide (e.g., aramid), aliphatic polyamide (e.g., nylon), aromatic polyimide (e.g., KAPTON), polyoxazole (e.g., ZYLON), polypropylene, polyester, and/or any combinations thereof. Additionally, the wall elements 40, 42 may be produced, or formed, at the same time (e.g., simultaneously on the same loom) as further described herein. Further, one or more materials may be applied to the wall elements 40, 42 to provide structural support, a fluid/air-tight seal, a resilient structure, bonding surfaces for attachment, protection from the environment (e.g., ultraviolet light, solar heating, etc.), protection of the double wall element from impact and abrasion, etc. For example, materials that may be applied to the wall elements 40, 42 may include silicone, urethane, polytetrafluoroethylene, polyimide, polyvinyl chloride, polychloroprene, and/or any combinations thereof.

The exemplary inflatable portion 30 may further include a plurality of stich members 44 extending between the first wall element 40 and the second wall element 42. The stitch members 44 may be configured, generally, to restrict movement between the first wall element 40 and the second wall element 42 when the cavity 45 is filled with a fluid. For example, a distance 50 may be defined between the first wall element 40 and the second wall element 42, and it may be described that the stitch members 44 restrict the distance from increasing beyond a selected value based on multiple factors such as but not limited to the length of the stitch members 30, flexibility of the stitch members 30, density of the stitch members 30 (e.g., stitch members 40 per area). When the inflatable portion 30 is in the stowed configuration and the cavity 45 is void of fluid therein, the stitch members 44 may allow the first and second wall elements 40, 42 to lie proximate one another for storage in a compact space.

Further, it may be described that, when the cavity 45 of the inflatable portion 30 is filled with a fluid, the inflatable portion 30 is expanded and resilient. The plurality of stitch members 44 may provide the resiliency (e.g., rigidity, stiffness, resistance to deflection, etc.) to the inflatable portion 30, e.g., by providing structural strength to the inflatable portion 30. Further, the plurality of stitch members 44 may be distribute any forces applied to the inflatable portion 30 across the entire, or a majority of, the inflatable portion 30. In other words, each stitch member 44 of the plurality of stitch members 44 may carry a portion of any force or load applied to the inflatable portion 30.

The stich members 44 may be further configured to provide one or more shapes out of the inflatable portions 30. For example, the stitch members 44 may provide substantially planar, panel structures formed by the inflatable portions 30. Further, for example, the stitch members 44 may provide substantially planar, box-shaped structures formed by the inflatable portions 30. In other words, the wall elements 40, 42 may be substantially parallel each to form a box-like shape. In at least one embodiment, the wall elements 40, 42 are substantially parallel each other for the entire inflatable portion 30. In other embodiments, the wall elements 40, 42 may only be substantially parallel each other about one or more sections of the inflatable portion 30.

Still further, for example, stitch members 44 in a first region of an inflatable portion 30 may be longer (e.g., the length of the stitch member 44 may be defined between the first wall element 40 and the second wall element 42) than stitch members 44 in a second region of the inflatable portion 30. Thus, the distance 50 in the first region may be greater than the distance 50 in the second region. In other words, the inflatable portion 30 may be thicker in the first region than in the second region. As a result, the lengths of the stitch members 44 may be configured, or selected, to provide a plurality of different shapes out of the inflatable portions 30. Further, the flexibility and/or density of the stitch members 44 may also be adjusted to provide a plurality of different shapes out of the inflatable portions 30. For example, the stitch density of the stitch members 44 in a first region (e.g., the number, or amount, of stitch members 44 in a region) of an inflatable portion 30 may be greater than the stitch density of the stitch members 44 in a second region of the inflatable portion 30. When the inflatable portion 30 is fully inflated, the second region may define a distance 50 greater than the first region because the first region has a higher stitch density than the second region (e.g., more structure may be provided by the stitch members 44 within the first region restricting the first wall element 40 from the second wall element 42 than in the second region). Further, for example, the flexibility of the stitch members 44 in a first region of an inflatable portion 30 may be greater than the flexibility of the stitch members 44 in a second region of the inflatable portion 30, and thus, the first region may define a greater distance 50 than the second region. In other words, one or more properties of the stitch members 44 may be selected, or configured, to provide a plurality of different shapes using the first and second wall elements 40, 42.

The length of the stitch members 44 may be about 0.5 inches to about 20 inches. For example, the length of the stitch members 44 may be greater than or equal to about 0.5 inches, greater than or equal to about 1 inch, greater than or equal to about 2 inches, greater than or equal to about 3 inches, greater than or equal to about 4 inches, greater than or equal to about 5 inches, greater than or equal to about 7 inches, greater than or equal to about 10 inches, etc. and/or less than or equal to about 20 inches, less than or equal to about 17 inches, less than or equal to about 15 inches, less than or equal to about 12 inches, less than or equal to about 11 inches, less than or equal to about 10 inches, less than or equal to about 8 inches, less than or equal to about 6 inches, less than or equal to about 5 inches, less than or equal to about 3 inches, etc.

The stitch members 44 may include one or more materials such as, e.g., carbon fiber, aromatic polyamide (e.g., aramid), aliphatic polyamide (e.g., nylon), aromatic polyimide (e.g., KAPTON), polyoxazole (e.g., ZYLON), polypropylene, polyester, and/or any combinations thereof. Additionally, the stitch members 44 may be produced, or formed, at the same time (e.g., simultaneously on the same loom) as the wall elements 40, 42 as further described herein. In at least one embodiment, the stitch members 44 may be described as being cylindrical threads. In at least another embodiment, the stitch members 44 may be described as being woven threads. It may be described the stitch members 44 do not divide compartments within the cavities 45 of the inflatable portions because, e.g., fluid may flow freely therethrough the stitch members 44 (e.g., as opposed to internal webbing or baffle structures location within a cavity of an inflatable portion). In other words, the stitch members 44 may be described as not restricting fluid flow within the cavity 45 of an inflatable portion 30 (e.g., as opposed to internal webbing or baffle structures location within a cavity of an inflatable portion that may be designed to restrict fluid flow within a cavity). Additionally, the stitch members 44 may not be described as forming a wall, a web, or the like—instead, each of the stitch members 44 may be described as an individual, or singular, member, or structure, extending between the first wall element 40 and the second wall element 42.

Although the wall elements 40, 42 and stitch members 44 may be formed using one or more techniques or processes and are not to be limited by any techniques or processes described herein, the wall elements 40, 42 and stitch members 44 may be formed using a "drop stitch" technique. Exemplary "drop stich" processes and structures may be described in U.S. Pat. No. 2,698,020 entitled "Inflatable Fabric Structural Element" and issued on Dec. 28, 1954, U.S. Pat. No. 3,327,738 entitled "Double Face Connected Carpet Structure" and issued on Jun. 27, 1987, U.S. Pat. No. 3,519,032 entitled "Pile Fabrics" issued on Jul. 7, 1970, U.S. Pat. No. 4,756,340 entitled "Jacquared Double Plush Fabric" and issued on Jul. 12, 1988, and U.S. Pat. No. 5,451,448 entitled "Flexible Ceramic Thermal Protection System Resistant To High Aeroacoustic Noise Comprising A Three-Dimensional Woven-Fiber Structure Having A Multilayer Top Fabric Layer, A Bottom Fabric Layer And An Intermediate Rib Fabric Layer" and issued on Sep. 19, 1995, each of which is hereby incorporated by reference in its entirety.

In at least one embodiment, it may be described that the inflatable portions 30 may be formed by a drop-stitch technical textile, which includes constituent layers of coating and a primary structure of fabric. Further, the drop-stitch textile may be woven on a specialized loom that fabricates a face-to-face double walled fabric having a plurality of tie threads consistent with the engineering and manufacturing requirements set forth by a design authority. Warp and Weft materials can be any material consistent with a weaving process. Coatings can be any material consistent with fabric coating of woven materials. Further, the drop stitch technical textile may be enclosed into an engineered inflatable structure by sealing the edges of the drop stitch technical textile with a flat seam, locally attaching the first wall, or panel, element and the second wall, or panel, element, or installing an additional material in the form of a tape for a smooth transitional surface. Such tape may typically, but not necessarily, be formed of a similar base material as the base fabric of the drop stitch technical textile, which may create a fluid-tight gore that can be filled and drained through a passage or valve (e.g., a non-return valve for protection against leaks in the overall system).

Figure 3:
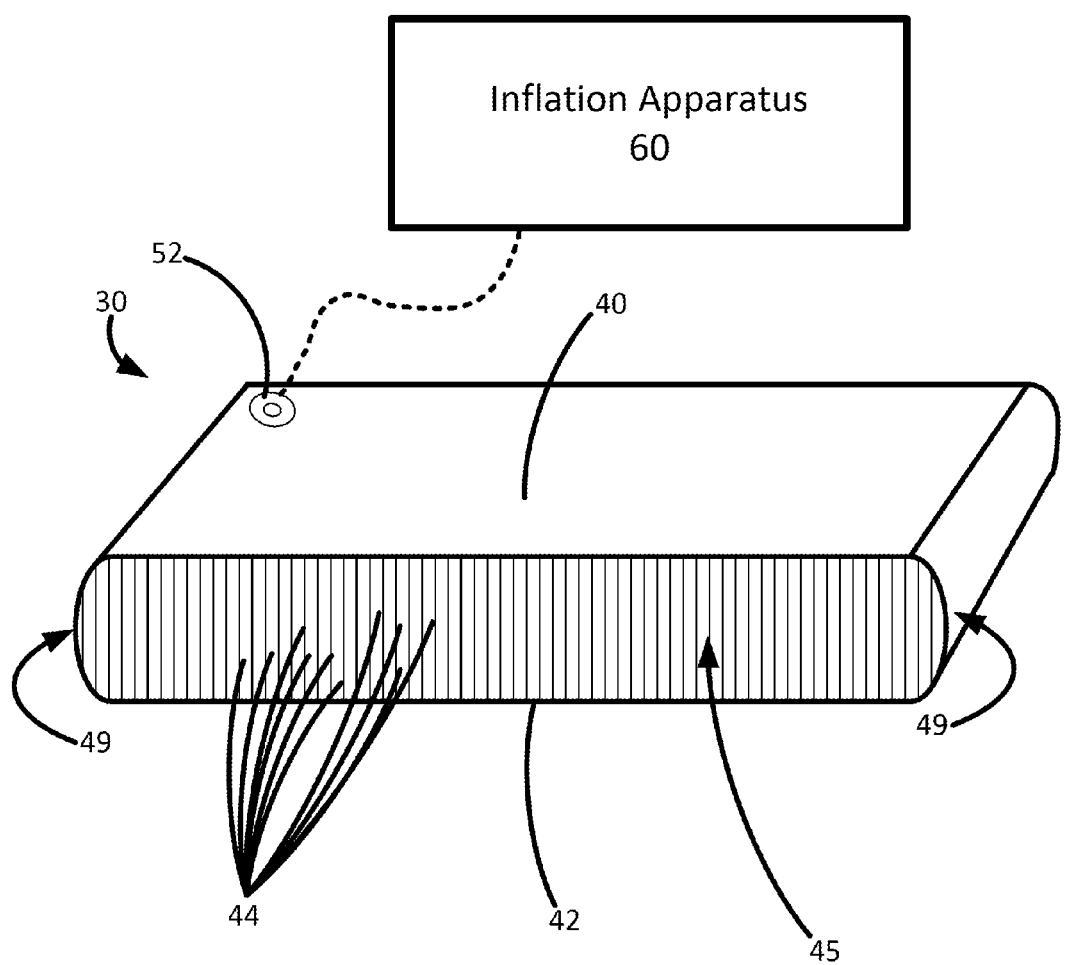
FIG. 3 is a perspective view of another exemplary inflatable portion of the deceleration apparatus of FIG. 1.

Another exemplary inflatable portion 30 is depicted in FIG. 3. As shown, the inflatable portion 30 includes a first wall element 40, a second wall element 42, and a plurality of stitch members 44 extending therebetween and defining a cavity 45 similar to the inflatable portion 30 of FIG. 2. Additionally, the inflatable portion 30 of FIG. 3 includes a valve 52 configured to be coupled to an inflation apparatus 60.

The inflation apparatus 60 may be any apparatus capable of providing, or delivering, fluid to the cavities 45 of the inflatable portions 30 of the deceleration apparatus 10. The inflation apparatus 60 may include a pressure vessel, or chamber, for holding pressurized material, such as, e.g., carbon dioxide (gas or liquid), nitrogen, helium, argon, air, expanding foam, etc. The inflation apparatus 60 may be actuated to inflate the inflatable portions 30 by delivering a fluid resulting from release of a pressurized material to inflate the inflatable portions 30 thereby placing, or configuring, the inflatable portions 30 in a deployed configuration. The inflation apparatus 60 may include, e.g., a valve that, when opened, releases gas from the pressure vessel through a conduit 62 and through the valve 52 into the cavity 45 of the inflatable portion 30.

The inflation apparatus 60 may further include gas generators that use energetic materials that deflagrate to produce a slag byproduct and a working gaseous medium. For example, the gas generators may include grain material and binder material such as combinations of sodium azide, and/or glycidyl azide polymer. Thermal management and slag production may be controlled by application of cooling salts such as those having lithium. Further, filtration and desiccant materials may refine the output when needed for high purity applications. The storage vessel containing this assembly of materials may not be initially pressurized, such as the open nozzle of a solid rocket engine (e.g., one example of a gas generator). Still further, for an inflation generator, the vessel may be designed for rapid changes in pressure and temperature as well as gradients of the same. Some exemplary inflation devices may be a hybrid of a pressurized storage vessel and a gas generator solid-grain type inflator, which may be efficient in terms of mass output versus mass of pre-operation storage.

The valve 52 may be a one-way valve such that, e.g., the valve 52 allows fluid to flow into the cavity 45 of the inflatable portion 30 and restricts fluid from leaving the cavity 45 of the inflatable portion 30. In another embodiment, the valve 52 may allow fluid to leave the cavity 45 of an inflatable portion 30 to enter another inflatable portion 30 to, e.g., maintain equal pressure through all of a plurality of inflatable portions 30 if an inflatable portion is leaking or otherwise deviating from a predefined filling schedule.

In one or more embodiments, it may be described that the deceleration apparatus 10 may include a centralized fill system that may be configured transfer inflation media into the inflatable portions 30 or an intermediate accumulator as may be used for mass transfer. To aid inflation time and minimize backpressure, the fill ports, or valve structures, for the inflatable portions 30 may be located directly on a body of a payload assembly. In another embodiment, it may be described that the deceleration apparatus 10 may include a decentralized fill system having storage apparatus for inflation as an integral part of each inflatable portion 30 (e.g., gore panel assembly, as a part of the inflatable portion 30, enclosed within the cavity of an inflatable portion 30, etc.) and can provide inflation mass flow rates consistent with inflation while moving in fluid fields of greater densities (e.g., requiring shape and structure be achieved in the shortest period of time possible without impacting the physical integrity or performance of the textile).

Further, the inflation apparatus 60 may be include a scoop aperture configured to capture fluid during deceleration for use in filling the plurality of inflatable portions 30 with fluid to configure the plurality of inflatable portions 30 into the deployed configuration. In other words, the inflation apparatus 60 may collect fluid passively during deceleration using the scoop aperture, which may be advantageous such that fluid need not be stored prior to inflation. For example, it may be described that the inflation apparatus 60 includes a set of scoops, which can be flexible or fully rigid, which will transfer inflation media into the inflatable portions 30 by collecting a positive pressure encountered by the movement of the body 11 through a fluid medium (e.g., which may be used on an Isotensoid).

The inflatable portion 30 shown in FIG. 3 further includes a pair of side wall elements 49 that extend between the first wall element 40 and second wall element 42. The side wall elements 49 may allow the inflatable portion 30 to retain a "box"-like shape when inflated in the deployed configuration (e.g., a "box"-like shape may define semi-squared corners where the side wall elements 49 meet, or intersect, the first and second wall elements 40, 42). In at least another embodiment, the inflatable portion 30 may not include side wall elements 49—instead the edges of the first wall element 40 and the second wall element 42 may be coupled, or edge-sealed, together (e.g., using an adhesives, stitching, mechanical fasteners, etc.).

Exemplary deceleration apparatus described herein may include one or more inflatable support portions. For example, one or more of the plurality of inflatable portions 30 may be used for structural support of the deceleration structure 33 when the plurality of inflatable portions 30 are configured in the deployed configuration.

The exemplary deceleration apparatus 70 depicted in FIGS. 4A-4D includes a plurality of inflatable support portions 72. The inflatable support portions 72 may include the same structures and elements as the inflatable portions 30 described herein. For example, the inflatable support portions 72 may include a first wall element, a second wall element, and a plurality of stitch members extending between the first wall element and the second wall element (e.g., a double wall, drop stitch structure).

The inflatable support portions 72, as shown, are coupled to two different inflatable portions 30 along the seam region 32 between the two different inflatable portions 30 and the body 11. The inflatable support portions 72 are triangularly-shaped to provide support to the inflatable portions 30. More specifically, the inflatable support portions 72 may support the inflatable portions 30 from forces applied opposite the direction 14 of travel. Additionally, the inflatable support portions 72 may further assist the plurality of inflatable portions 30 from moving into and forming the deceleration structure 30 when transitioning from the stowed configuration to the deployed configuration. For example, the inflatable support portions 72 may be inflated at the same time that the inflatable portions 30 are inflated, and may be configured to push, or position, the other inflatable portions 30 into proper location to form the deceleration structure. Further, the inflatable support portions 72 may be coupled to one or more of the body 11 and the inflatable portions 30 using the same apparatus and techniques as described herein with respect to the coupling of the inflatable portions 30 to one another.

Figure 4A:
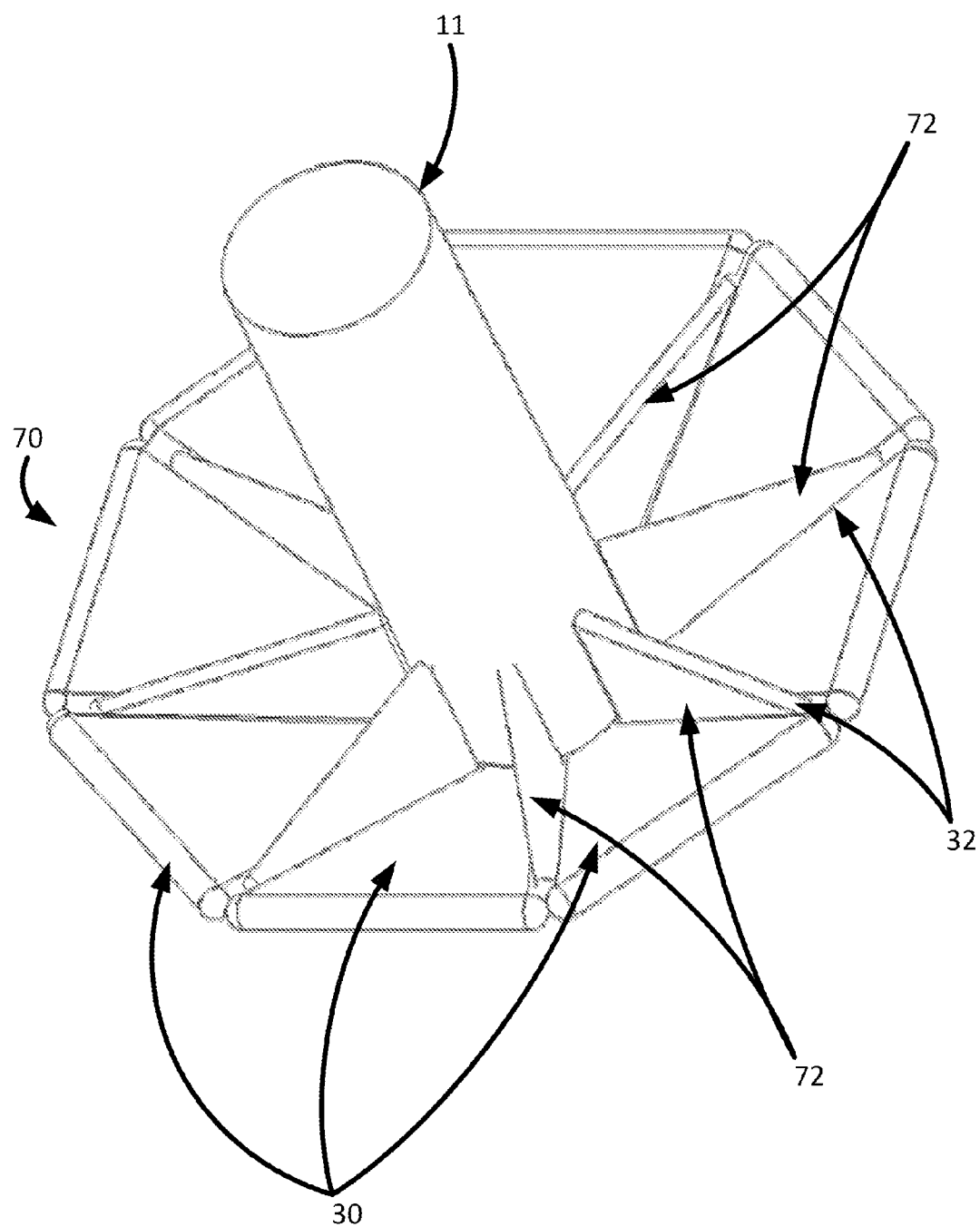
FIG. 4A is a perspective view of an exemplary deceleration apparatus coupled to a spacecraft and configured in a deployed configuration.
Figure 4B:
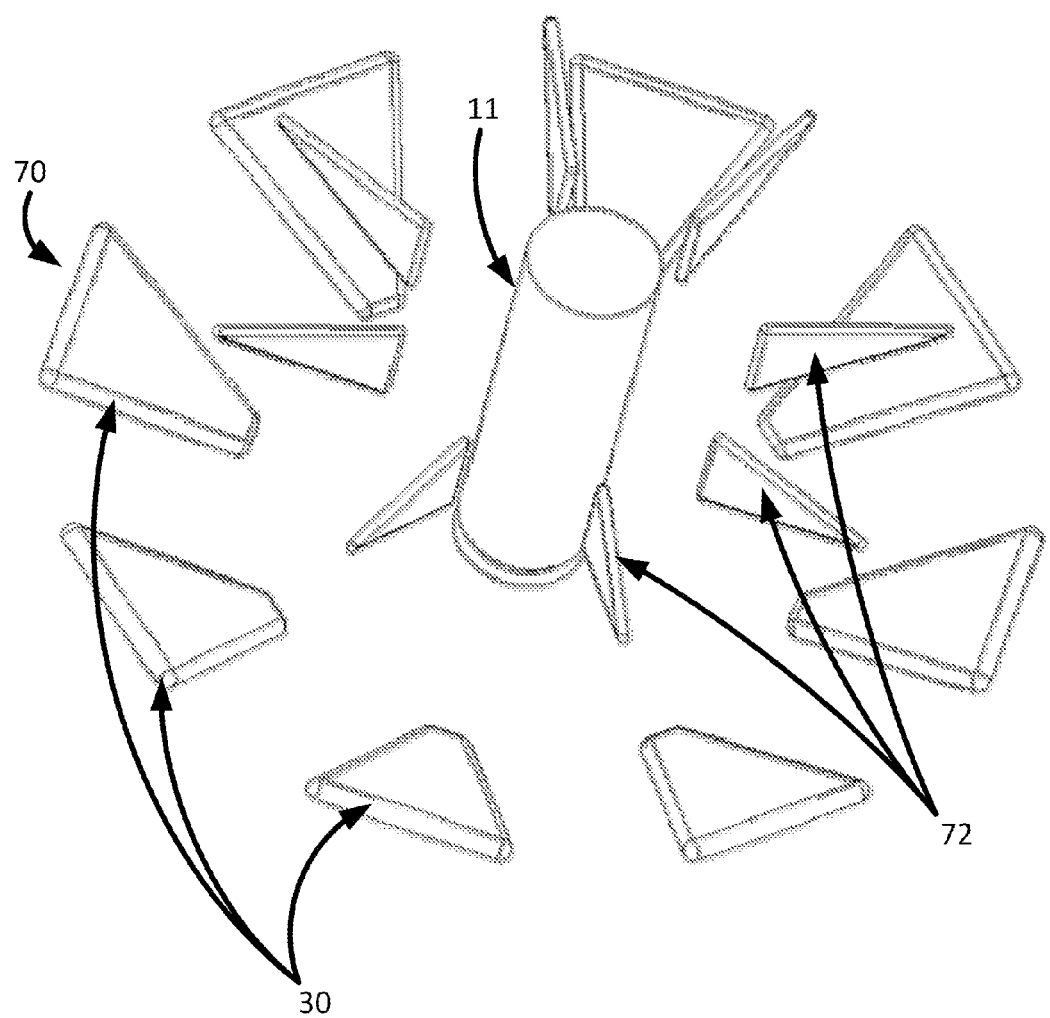
FIG. 4B is an exploded, perspective view of the deceleration apparatus of FIG. 4A.
Figure 4C:
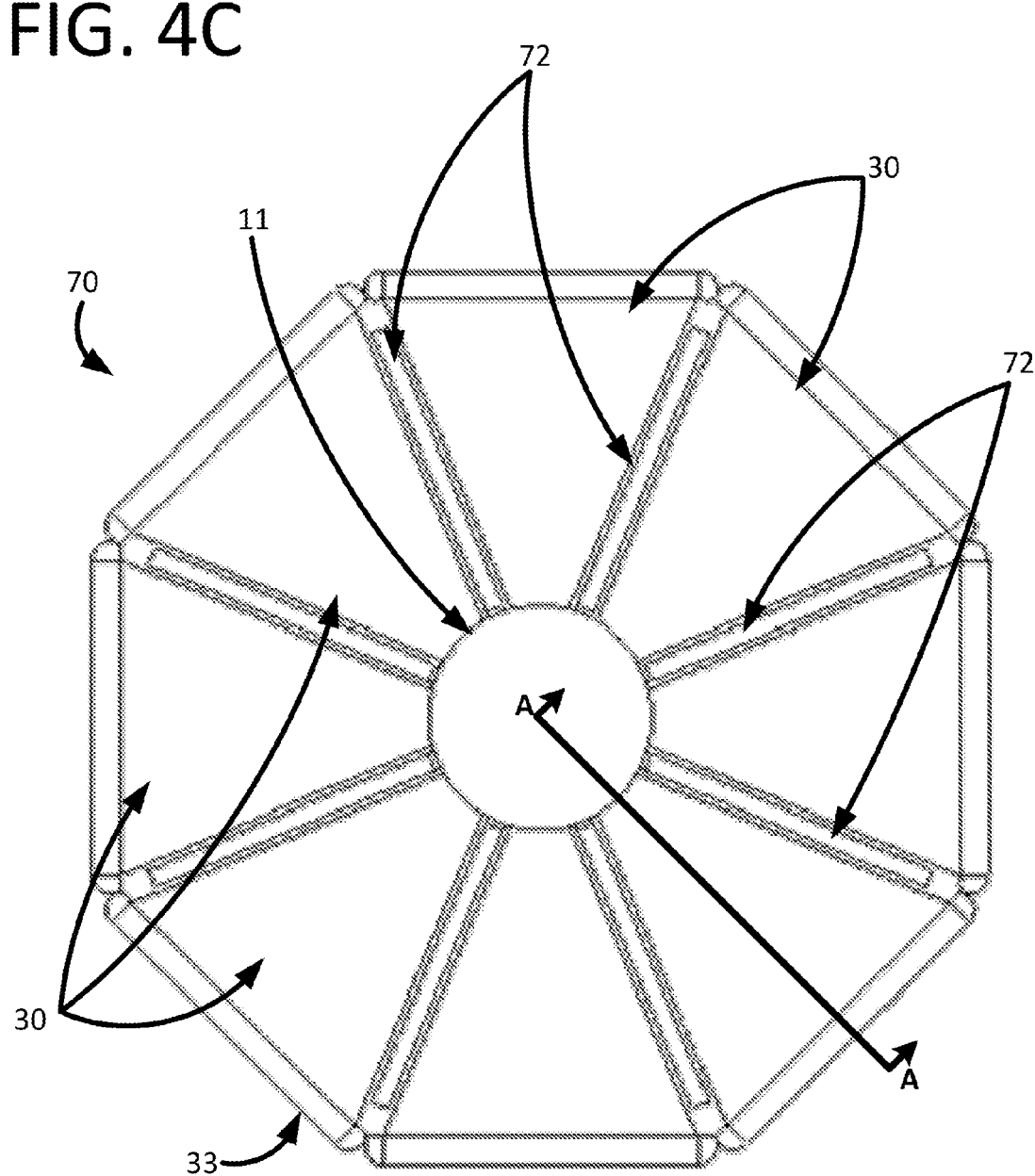
FIG. 4C is a top plan view of the deceleration apparatus of FIG. 4A.
Figure 4D:
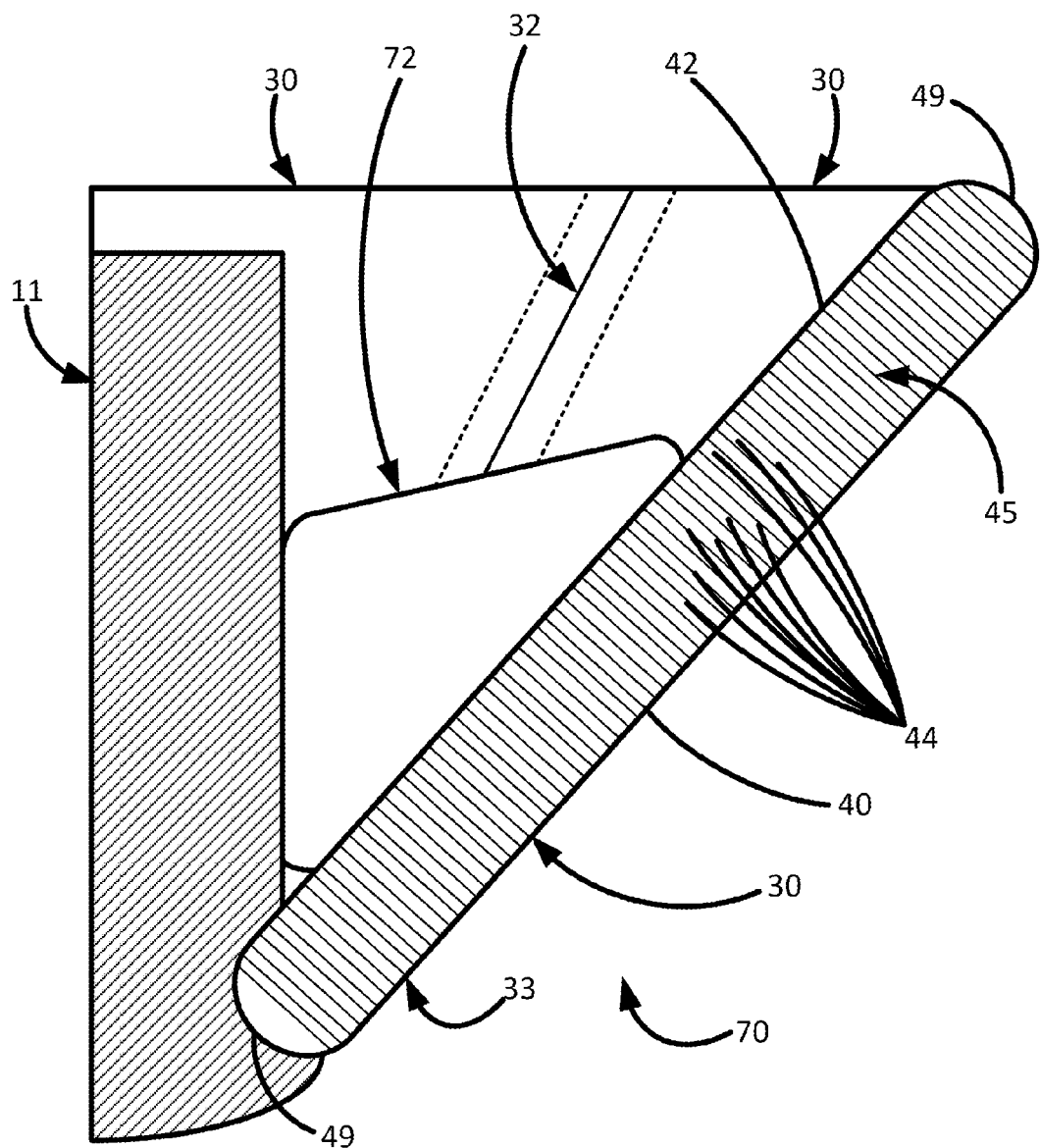
FIG. 4D is a cross-sectional view of a portion of the deceleration apparatus of FIG. 4A taken across line A-A of FIG. 4C.

A cross-sectional view of a portion of the deceleration apparatus of FIG. 4A taken across line A-A of FIG. 4C is shown in FIG. 4D that shows the construction and configuration of an inflatable portion 30 and an inflatable support portion 72 with respect to the body 11. As shown, the inflatable portion 30 includes a first wall element 40, a second wall element 42, a plurality of stitch members 44 extending between the first wall element 40 and the second wall element 42, and a pair of sidewall elements 49 extending between the first wall element 40 and the second wall element 42 defining a cavity 45. Further, the triangularly-shaped inflatable support portion 72 is shown coupled to and adjacent the inflatable portion 30 and coupled to and adjacent the body 11. Further shown in FIG. 4D is a seam region 32 between two different inflatable portions 30 that is denoted between a pair of dotted lines.

Exemplary deceleration apparatus may further be configured to control, or affect, the trajectory of a body when decelerating, e.g., through an atmosphere of a planet. To provide such control or effect, the exemplary deceleration apparatus may include one or more regions or structures and/or functionality to change the deceleration structure to affect the aerodynamics of the deceleration structure.

For example, the deceleration apparatus may include one or more regions that may affect the symmetry of the deceleration structure about the axis 12 such as, e.g., tab regions, slats, control surfaces, spoilers, flaps, trim regions, spars, etc. Further, for example, the deceleration apparatus may be configured such that one or more inflatable portions are not inflated or partially inflated (e.g., not placed in a deployed or fully-deployed configuration) while one or more inflatable portions are fully inflated (e.g., placed in a fully-deployed configuration) to affect the symmetry of the deceleration structure about the axis 12. When the symmetry of the deceleration structure about the axis 12 is altered, one region of the deceleration structure may provide more lift than at least another region of the deceleration structure, which may, among other things, assist in stabilizing the body 11 and deceleration apparatus during deceleration.

Figure 5A:
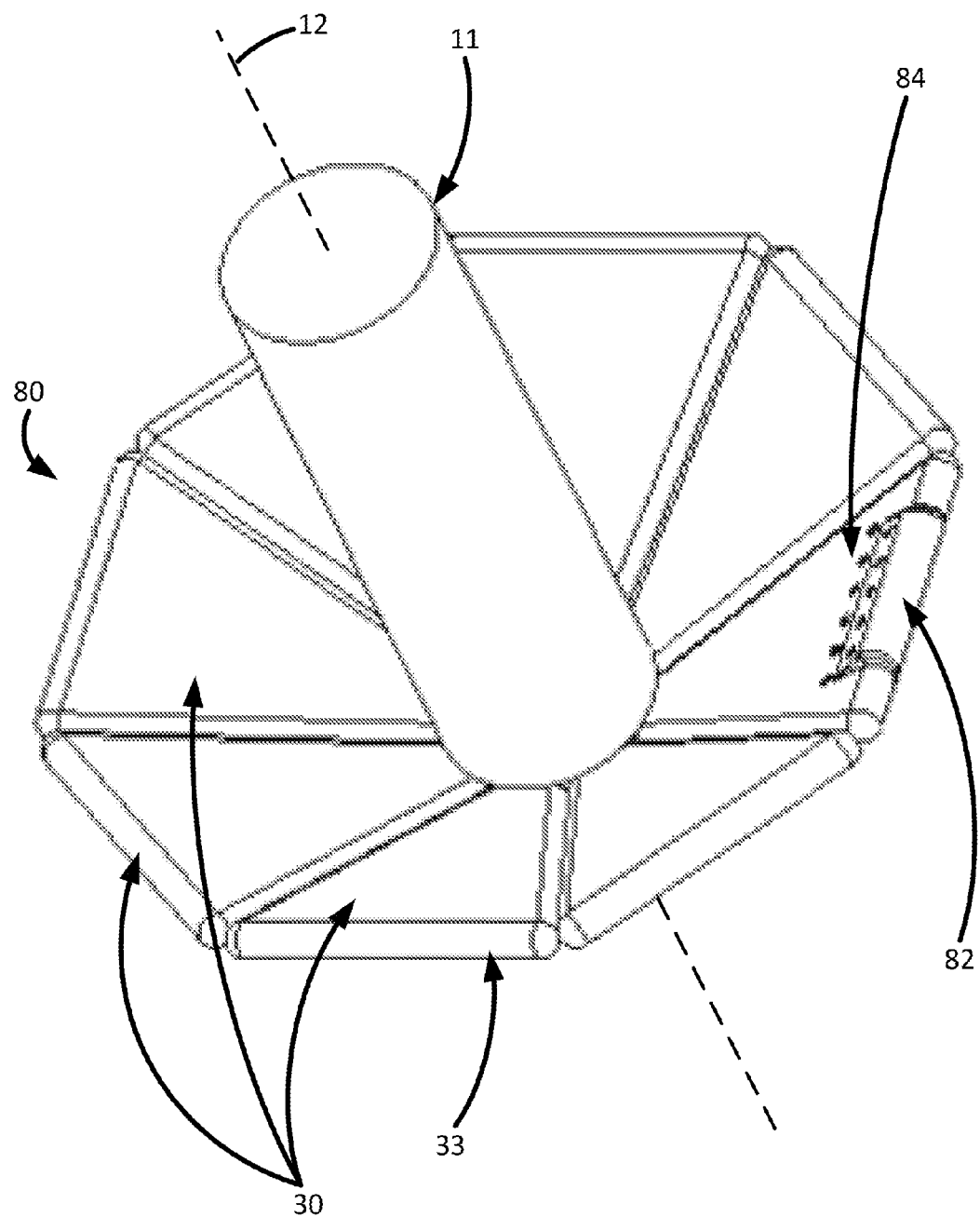
FIG. 5A is a perspective view of an exemplary deceleration apparatus coupled to a spacecraft and including a tab region in a stowed configuration.
Figure 5B:
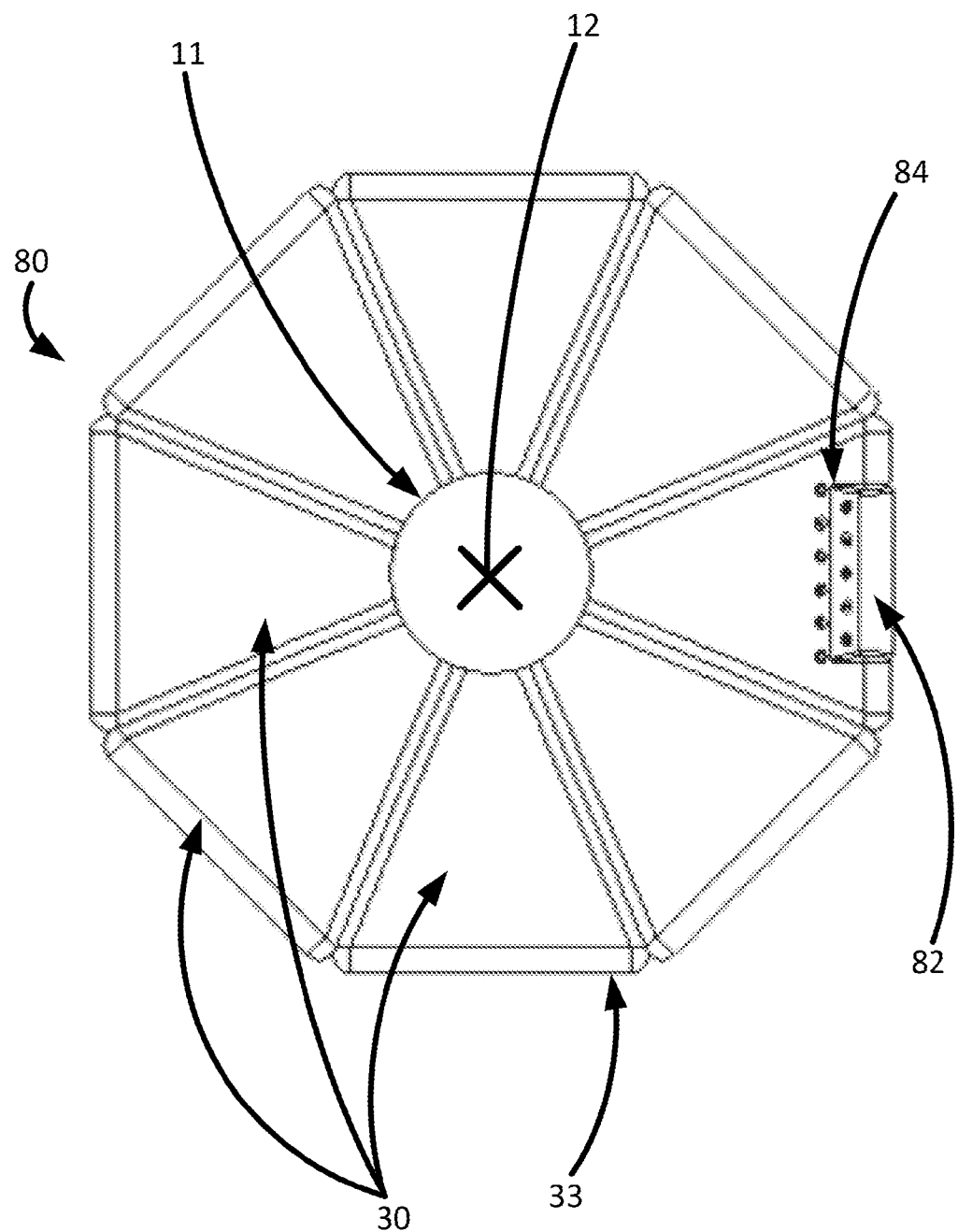
FIG. 5B is a top plan view of the deceleration apparatus of FIG. 5A.

Exemplary deceleration apparatus 80 that includes an element configured to affect the symmetry of the deceleration structure about the axis 12 is depicted in FIGS. 5A-5D. More particularly, one of the inflatable portions 30 includes, or defines, a region, or portion, 82 that may be restricted, or restrained, from deploying when the inflatable portion 30 is configured in the deployed configuration. For example, as shown in FIGS. 5A-5B, restraint apparatus 84 is configured to restrict region 82 of the inflatable portion 30 from filling with a fluid to deploy (even though the remainder of the inflatable portion 30 has been inflated and deployed). As shown, the restraint apparatus 84 includes attachment features that are affixed to the surface of the panel wall exterior face or surface, which may serve as the anchor points for the mechanism (e.g., which is flexible and resilient enough to be stowed in the system storage assembly). Using those attachment points, a quick release linear knot such as a braid of interlocking loops may allow for single point activation of the deployment, which may accomplished by cutting or releasing the terminal knot, and upon severing this tie, the entirety of the knot may be released in line due to the lack tension required to maintain the shape of the loops.

Figure 5C:
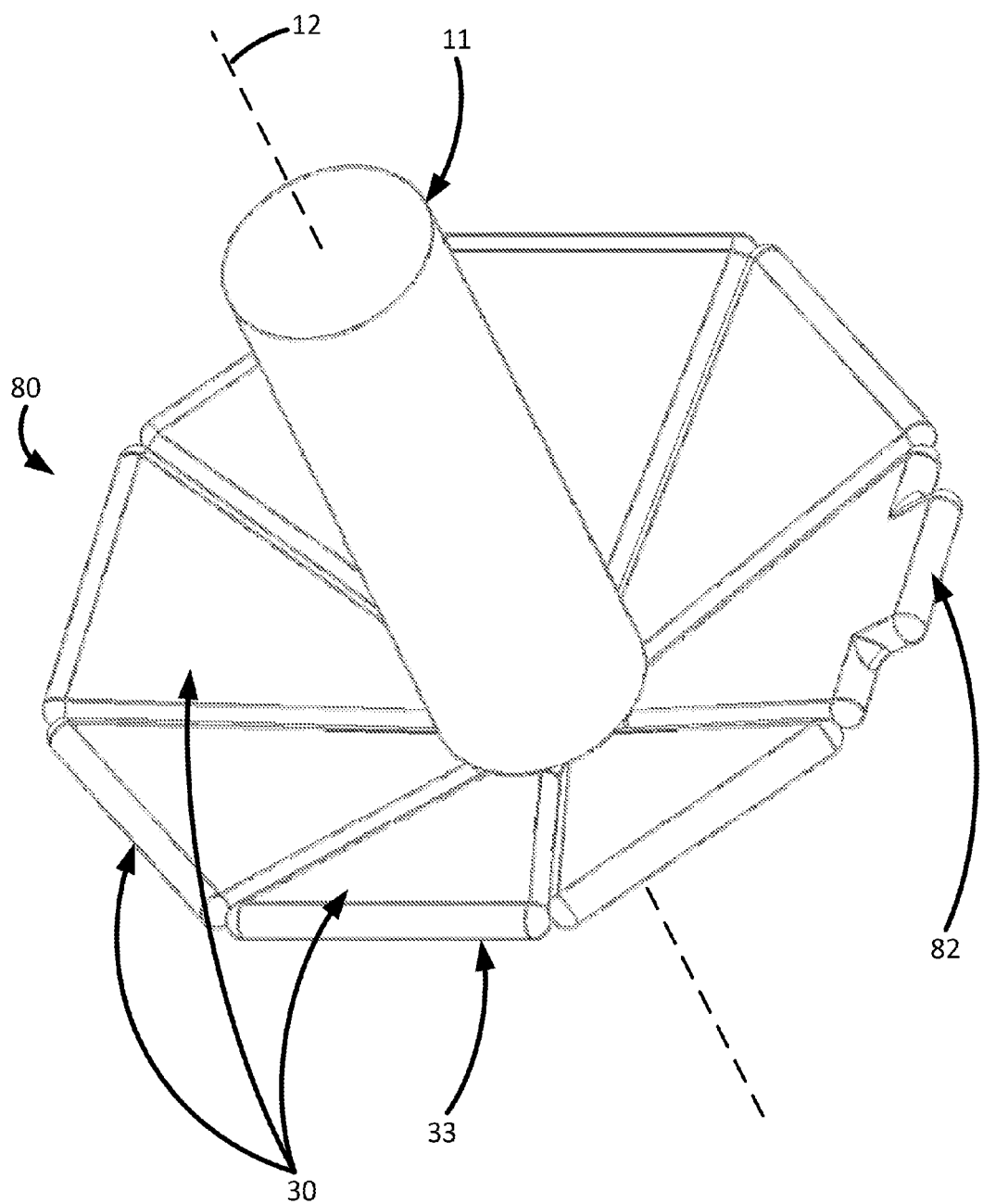
FIG. 5C is a perspective view of the deceleration apparatus of FIG. 5A including the tab region in a released configuration.
Figure 5D:
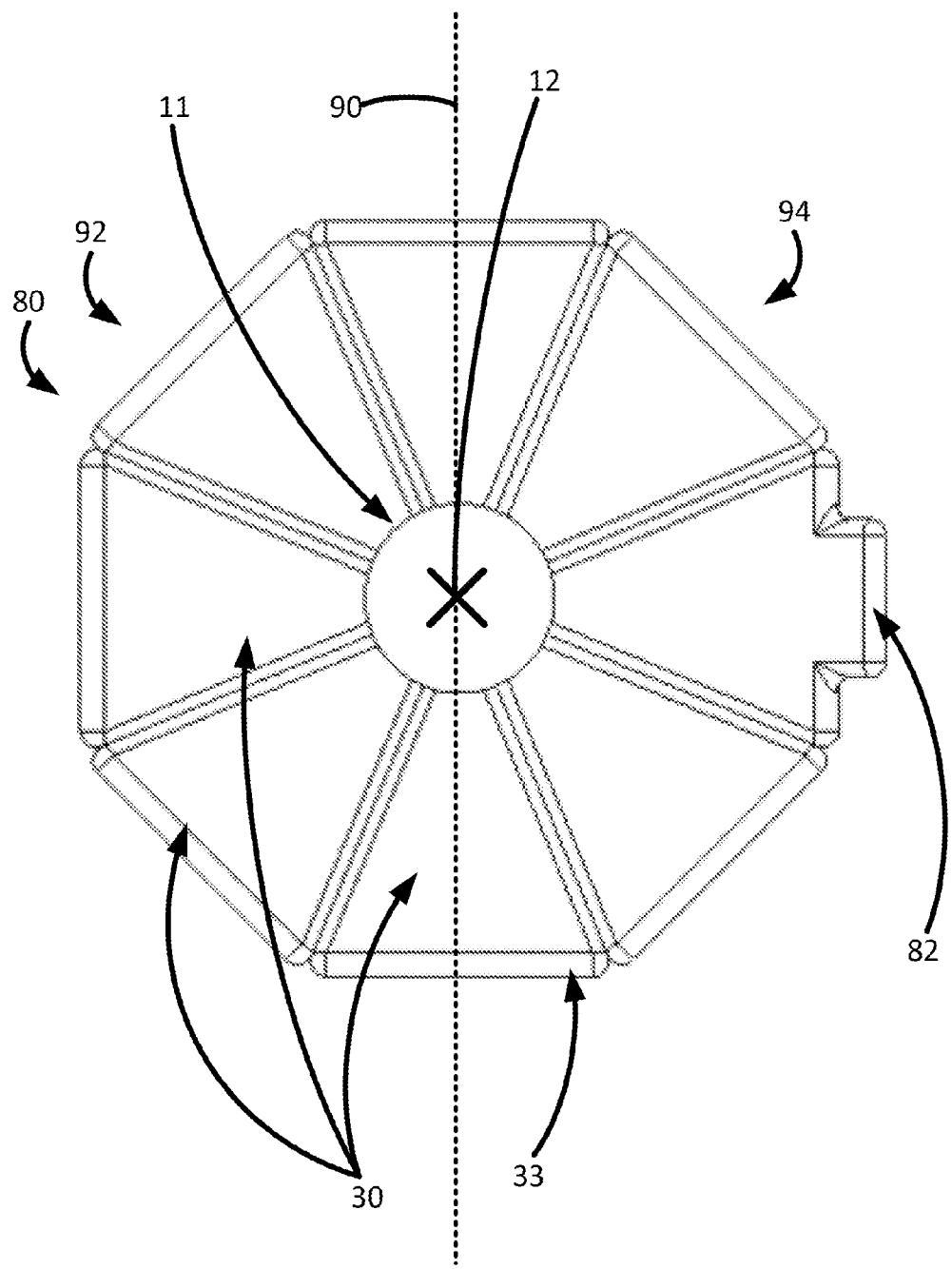
FIG. 5D is a top plan view of the deceleration apparatus of FIG. 5A including the tab region in a released configuration.

The restraint apparatus 84 may release the region 82 to allow the region 82 to fill with fluid and deploy as shown in FIGS. 5C-5D. When the region 82 has deployed, the deceleration apparatus 80 may define an asymmetric deceleration structure about the axis 12. As described herein, when a deceleration structure is described as being asymmetric, it is to be understood that that the drag profile when viewed along the axis 12 is not uniform about the deceleration structure, and instead, one or more regions may generate more lift than one or more other regions of the deceleration structure. Further, one or more regions may define a larger deceleration surface area while one or more regions may define a smaller deceleration surface area. For example, as shown in FIG. 5D, if the deceleration apparatus 80 is divided along a line 90 extending through the axis 12 and perpendicular thereto, the left region 92 (i.e., the region of the deceleration apparatus 80 located to the left of line 90) defines a smaller deceleration surface area than the right region 94 (i.e., the region of the deceleration apparatus 80 located to the right of line 90). As such, when the restraint apparatus 84 releases the region 82, the deceleration apparatus 80 may transition from a symmetric deceleration structure to an asymmetric deceleration structure.

Figure 6A:
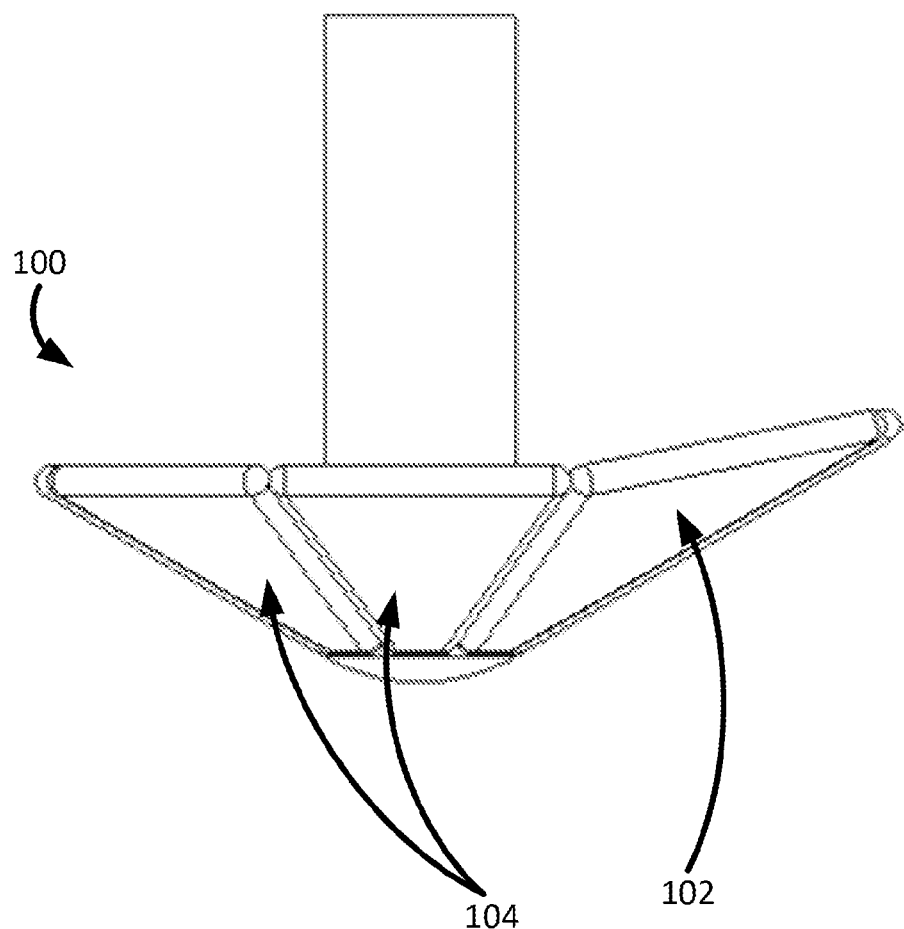
FIG. 6A is a side view of an exemplary asymmetric deceleration apparatus.
Figure 6B:
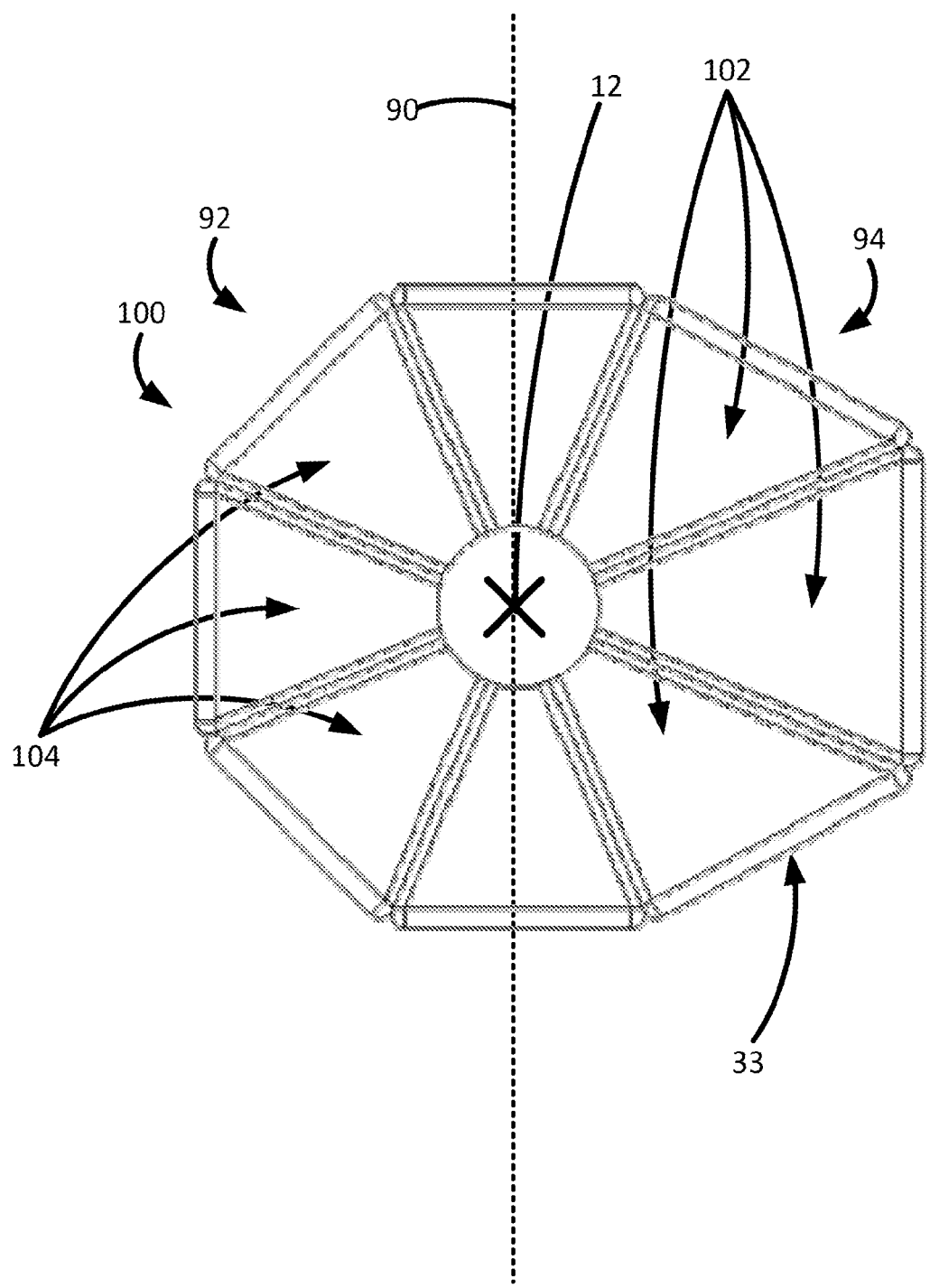
FIG. 6B is a top plan view of the asymmetric deceleration apparatus of FIG. 6A.

Further, exemplary deceleration apparatus may be configured to always be asymmetric when in the deployed configuration. For example, exemplary deceleration apparatus 100 as shown in FIGS. 6A-6B defines an asymmetric deceleration structure when configured in the deployed configuration.

More specifically, the deceleration apparatus 100 includes three inflatable portions 102 located to one side of the deceleration structure that are larger than the other five inflatable portions 104. The imbalance, or non-uniformity, in the size and placement of the inflatable portions 102, 104 may create an asymmetric deceleration structure, which may be beneficial as described herein. Similar to deceleration apparatus 80, deceleration apparatus 100 may be divided along a line 90 extending through the axis 12 and perpendicular thereto, the left region 92 (i.e., the region of the deceleration apparatus 80 located to the left of line 90) defines a smaller deceleration surface area than the right region 94 (i.e., the region of the deceleration apparatus 100 located to the right of line 90) as shown in FIG. 6B.

Exemplary deceleration apparatus may further include more than one deployment configuration or stage such that, e.g., the deceleration apparatus may assist the deceleration of a body through one or more time periods of deceleration, allow for reduce mass utilization when a thermal protection system (TPS) is employed (e.g., the second stage may not see any appreciable aerothermal heating, and thus, may not require mass-intensive TPS), allow for re-introduction of a symmetric profile (such, e.g., as the first stage being asymmetrical and the second stage being symmetrical about the central axis of the rigid body), etc. An exemplary two-deployment configuration, or stage, deceleration apparatus 110 is depicted in FIGS. 7A-7B.

Figure 7A:
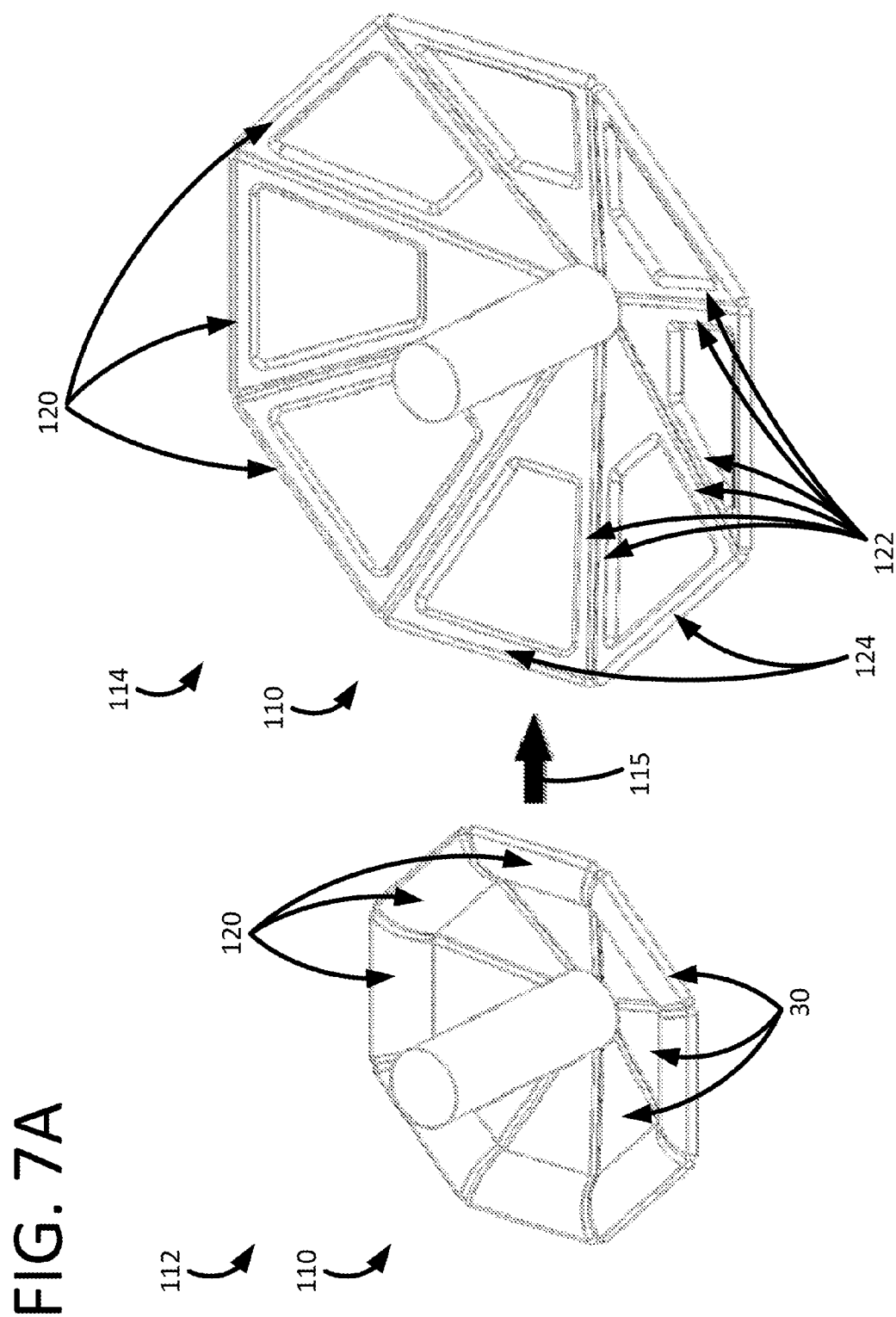
FIG. 7A is a perspective view of exemplary deceleration apparatus coupled to a spacecraft and configured in a first deployed configuration and a second deployed configuration.

More particularly, on the left side of each of FIGS. 7A-7B, the deceleration apparatus 110 is configured in a first deployed configuration, which may be similar to the previously-described deployed configurations where the deceleration structure formed, or defined, by the deceleration apparatus 110 has a greater deceleration surface area than the body 11 and the deceleration apparatus 110 prior to deployment. In this embodiment, however, regions 120 of the inflatable portions 30 may be retrained, e.g., using retraining apparatus similar to the restraining apparatus 84 described herein with reference to FIGS. 5A-5D, during the first deployed configuration 112. For example, the regions 120 may be folded, or rolled, over themselves and restrained on the back side of the deceleration structure.

The deceleration apparatus 110 may transition 115 from the first deployed configuration 112 to the second deployed configuration 114 by releasing the regions 120 of the inflatable portions 30. After the regions 120 of the inflatable portions are released, the regions 120 may fill with fluid and become deployed as shown on the right side of FIGS. 6A-6B. Additionally, the second deployed configuration 114 may defined a deceleration surface area that is greater than the deceleration surface area of the first deployed configuration.

As shown in this embodiment, the regions 120 when deployed may include rib portions 122 extending radially from the remainder of the inflatable portions and end portions 124 located on a distal end of the rib portions 122. Additionally, although an aperture or opening appears to extend between the rib portions 122, material such as, e.g., heat shield material, etc. may cover the front side (e.g., the side facing the direction 14 of travel) of the deceleration structure such that no aperture or opening extends through the deceleration structure.

In at least one embodiment, it may be described that a secondary stage (or stages further to second stage) may be employed. The secondary stage of the declaration apparatus may be of a monolithic form (e.g., where part of the first stage is retained to allow for immediate deployment of a pre-pressurized body of fill media) or can be a composite form having a wholly unique and independent structure, and may either employ expansion of the initial fill media system.

Figure 8:
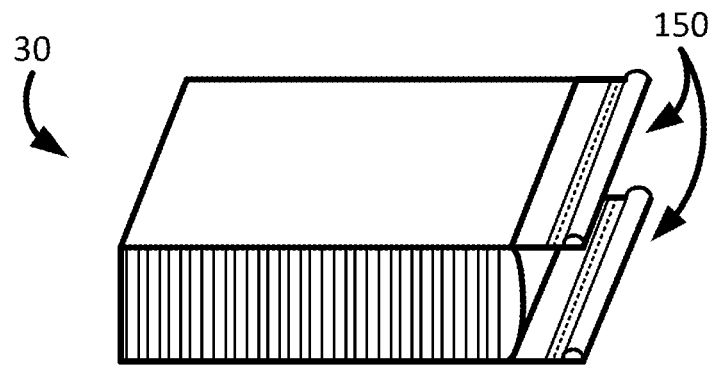
FIG. 8 is a side perspective view of exemplary inflatable portions and coupling apparatus for coupling the inflatable portions to other structures or apparatus.
Figure 8:
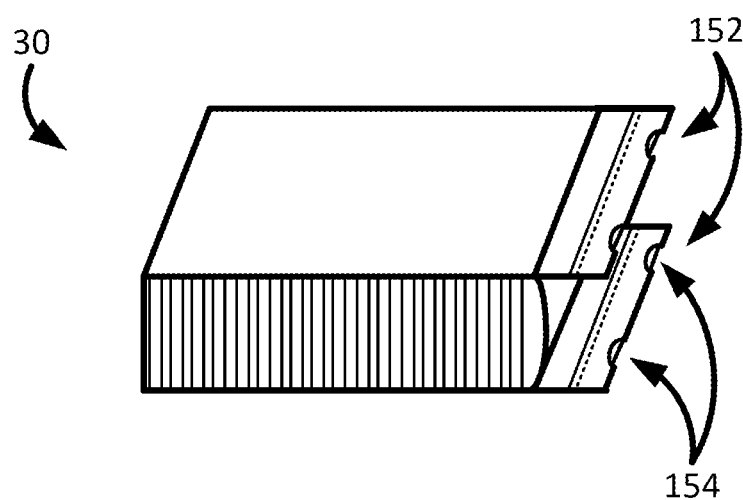
Figure 8:
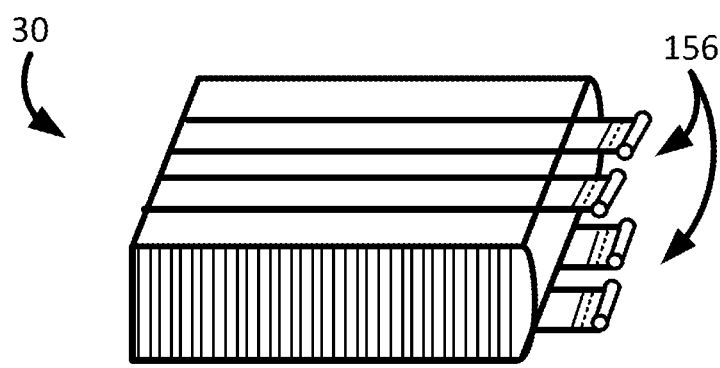

The inflatable portions 30 may be coupled to one another, the body 11, and/or any other portion or structure using various structures and techniques. Three different coupling techniques are depicted in FIG. 8. For example, an exemplary inflatable portion 30 may be coupled to another element through the use of a bolt-rope coupling configuration 150. More specifically, a rope, or similar material, may be located within a folded over and coupled portion of the material, and a rigid C-channel portion may be slid over the rope located within the folded over portion of material to provide an interference fit therebetween. The bolt-rope coupling configuration may be beneficial to distribute any forces impacted on the inflatable portion 30 across the entire coupling.

Further, for example, a "drawbar" coupling configuration 152 is also depicted. A rigid shaft, or draw bar, is located within a fold of the material of the inflatable portion 30. In this configuration, however, openings 154 may expose one or more portions of the rigid shaft, which may be coupled thereto. Still further, for example, a "strap" coupling configuration 156 is further depicted in which straps are fixedly coupled to the inflatable portion and the straps may be releasably coupled to other portions such as the body 11.

Figure 9:
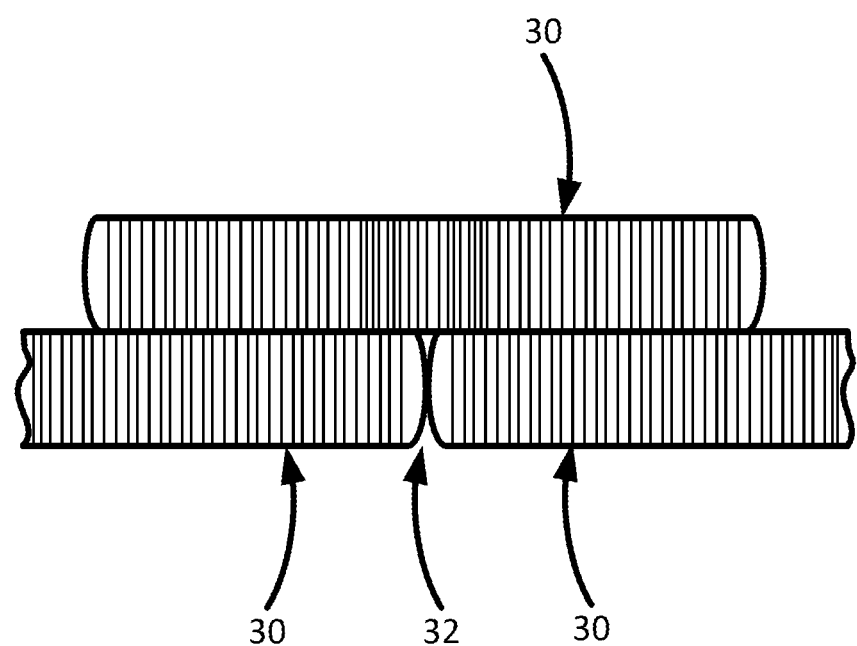
FIG. 9 is a side cross-sectional view of an overlapping, laminated configuration of inflatable portions for use in exemplary deceleration apparatus.

Exemplary deceleration apparatus described herein may include one or more inflatable portions 30 that overlap one another to, e.g., provide more support, etc. A cross-sectional view of three inflatable portions 30 with one inflatable portion 30 overlapping, or laminating, a seam region 32 between the other two inflatable portions 30 is depicted in FIG. 9. Such seam overlapping, or laminated, configuration may provide support to the seam regions 32 and provide additional redundancy to the exemplary deceleration apparatus. Although only a single seam region 32 is depicted being laminated, or overlapped, by an inflatable portions in FIG. 9, a plurality of seam regions 32 (e.g., two or more seam regions 32, all the seam regions 32, all the seam regions 32 facing a particular direction, etc.) of the exemplary deceleration apparatus described herein may be laminated, or overlapped, by another inflatable portion 30.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. An apparatus for decelerating a body along a direction of travel, the body comprising a front end portion directed toward the direction of travel and a rear end portion opposite the front end portion, the apparatus comprising:
   a plurality of inflatable portions coupled to the body at the front end portion of the body and extending at least partially toward the rear end portion of the body, wherein each inflatable portion of the plurality of inflatable portions comprises:
     a first wall element,
     a second wall element coupled to the first wall element to define a cavity, and
     a plurality of stich members, wherein each stitch member of the plurality of stitch members extends between and is coupled to each of the first wall element and the second wall element to restrict movement between the first wall element and the second wall element when the cavity is filled with a fluid,
   wherein each inflatable portion of the plurality of inflatable portions is configurable in at least a stowed configuration and a deployed configuration,
   wherein each inflatable portion of the plurality of inflatable portions is deflated when configured in the stowed configuration and is inflated with fluid so as to be expanded to provide a planar panel structure resilient to deflection in the direction of travel when configured in the deployed configuration,
   wherein, when at least one inflatable portion of the plurality inflatable portions is configured in the deployed configuration, the plurality of inflatable portions are configured to form a blunted-cone deceleration structure providing a deceleration surface area facing the direction of travel greater than a pre-deployment surface area facing the direction of travel defined by the body when each inflatable portion of the plurality of inflatable portions is configured in the stowed configuration; and
   an inflation apparatus coupled to the plurality of inflation portions and configured to provide fluid to the plurality of inflation portions to configure each inflation portion of the plurality of inflation portions in at least the deployed configuration.

2. The apparatus of claim 1, wherein the first wall element, the second wall element, and the plurality of stich members define a double-walled, drop-stitch structure.

3. The apparatus of claim 1, wherein at least one inflatable portion of the plurality of inflatable portions further comprises a one-way valve for providing fluid into the cavity and to restrict fluid from leaving the cavity.

4. The apparatus of claim 1, wherein the plurality of inflatable portions comprises a support inflatable portion coupled to and extending between at least another inflatable portion of the plurality of inflatable portions and one or more of the body and at least yet another inflatable portion of the plurality of inflatable portions to provide support therebetween when one or more inflatable portions of the plurality of inflatable portions are configured in the deployed configuration.

5. The apparatus of claim 1, wherein the plurality of stitch members of each inflatable portion of the plurality of inflatable portions define a stitch density about each inflatable portion, wherein the stitch density is uniform across at least one inflatable portion of the plurality of inflatable portions to form a selected shape when the at least one inflatable portion is configured in the deployed configuration.

6. The apparatus of claim 1, wherein the plurality of stitch members of each inflatable portion of the plurality of inflatable portions define a stitch density about each inflatable portion, wherein the stitch density is irregular across at least one inflatable portion of the plurality of inflatable portions to form a selected shape when the at least one inflatable portion is configured in the deployed configuration.

7. The apparatus of claim 1, wherein each stitch member of the plurality of stitch members of each inflatable portion of the plurality of inflatable portions define a stitch length, wherein the stich lengths are irregular across at least one inflatable portion of the plurality of inflatable portions to form a selected shape when the at least one inflatable portion is configured in the deployed configuration.

8. The apparatus of claim 1, wherein each inflatable portion of the plurality of inflatable portions comprises at least one side wall element coupled to and extending between the first wall element and the second wall element, wherein the at least one side wall element further defines the cavity.

9. The apparatus of claim 1, wherein a seam is defined between at least two inflatable portions of the plurality of inflatable portions positioned adjacent each other, wherein at least one inflatable portion of the plurality of inflatable portions other than the at least two inflatable portions is positioned to extend across and overlap the seam to provide support to the seam.

10. The apparatus of claim 1, wherein the inflation apparatus comprises a vessel for holding a material for use in filling the plurality of inflatable portions with fluid to configure the plurality of inflatable portions into the deployed configuration.

11. The apparatus of claim 1, wherein the inflation apparatus is configured to inflate each inflation portion of the plurality of inflation portions individually.

12. The apparatus of claim 1, wherein the inflation apparatus comprises a scoop aperture configured to capture fluid during deceleration for use in filling the plurality of inflatable portions with fluid to configure the plurality of inflatable portions into the deployed configuration.

13. The apparatus of claim 1, wherein the plurality of inflatable portions define a deceleration structure when each inflatable portion of the plurality of inflatable portions is configured in the deployed configuration, wherein the deceleration structure is asymmetric about an axis along the trajectory of the body such that at least one region of the deceleration structure provides more lift than at least another region of the deceleration structure.

14. The apparatus of claim 1, wherein at least one inflatable portion of the plurality of inflatable portions is configurable in the stowed configuration while at least another inflatable portion of the plurality of inflatable portions is configured in the deployed configuration.

15. The apparatus of claim 1, wherein the deployed configuration is a first deployed configuration and the plurality of inflatable portions are further configurable in at least a second deployed configuration, and wherein, when in the second deployed configuration, the plurality of inflatable portions provide a deceleration surface area greater than a deceleration surface area of the plurality of inflatable portions when in the first deployed configuration.

16. The apparatus of claim 1, wherein the apparatus further comprises a restraint apparatus configurable in at least a storage configuration and a released configuration, wherein the restraint apparatus, when in the storage configuration, restricts at least one region of at least one inflatable portion of the plurality of inflatable portions from filling with the fluid when the at least one inflatable portion is configured in the deployed configuration, and wherein the restraint apparatus, when in the released configuration, releases the at least one region of the at least one inflatable portion of the plurality of inflatable portions for filling with the fluid.

17. An apparatus for decelerating a body along a direction of travel, the body comprising a front end portion directed toward the direction of travel and a rear end portion opposite the front end portion, the apparatus comprising:
a plurality of inflatable portions coupled to the body at the front end portion of the body and extending at least partially toward the rear end portion of the body, wherein each inflatable portion of the plurality of inflatable portions comprises:
a first wall element,
a second wall element coupled to the first wall element to define a cavity, and
a plurality of stich members, wherein each stitch member of the plurality of stitch members extends between and is coupled to each of the first wall element and the second wall element to restrict movement between the first wall element and the second wall element when the cavity is filled with a fluid,
wherein each inflatable portion of the plurality of inflatable portions is coupled together to form a blunted-cone deceleration structure when the plurality of inflatable portions are inflated with fluid so as to be expanded to provide a plurality of planar panel structures resilient to deflection in the direction of travel,
wherein the blunted-cone deceleration structure provides a deceleration surface area facing the direction of travel greater than a pre-deployment surface area facing the direction of travel defined by the body prior to inflation of the plurality of inflatable portions; and
an inflation apparatus coupled to the plurality of inflation portions and configured to provide fluid to the plurality of inflation portions to inflate each inflation portion of the plurality of inflation portions to form the deceleration structure.

18. The apparatus of claim 17, wherein the inflation apparatus is configured to provide fluid to each inflation portion of the plurality of inflation portions individually to control how much fluid is provided to each inflation portion of the plurality of inflation portions, wherein at least one inflation portion of the plurality of inflation portions is configured to have less fluid than at least another inflation portion of the plurality of inflation portions such that at least one region of the deceleration structure provides more lift than at least another region of the deceleration structure.

* * * * *